United States Patent
Mohajer et al.

(10) Patent No.: US 12,314,991 B2
(45) Date of Patent: May 27, 2025

(54) METHOD AND SYSTEM FOR CONTROLLING A GRAPHICAL USER INTERFACE BY TELEPHONE

(71) Applicant: SoundHound, Inc., Santa Clara, CA (US)

(72) Inventors: Kamyar Mohajer, Mississauga (CA); Keyvan Mohajer, Los Gatos, CA (US); James Hom, Palo Alto, CA (US); Evelyn Jiang, Cupertino, CA (US)

(73) Assignee: SoundHound AI IP, LLC.

( * ) Notice: Subject to any disclaimer, the term of this patent is extended or adjusted under 35 U.S.C. 154(b) by 72 days.

(21) Appl. No.: 17/408,476

(22) Filed: Aug. 22, 2021

(65) Prior Publication Data

US 2023/0059765 A1    Feb. 23, 2023

(51) Int. Cl.
*G06Q 30/0601* (2023.01)

(52) U.S. Cl.
CPC ..... *G06Q 30/0619* (2013.01); *G06Q 30/0623* (2013.01); *G06Q 30/0631* (2013.01); *G06Q 30/0633* (2013.01); *G06Q 30/0643* (2013.01)

(58) Field of Classification Search
CPC . G06Q 30/0633–0635; G06Q 30/0619; G06Q 30/0631; G06Q 30/0641; G06Q 30/0601–0643; G06Q 50/12; G06Q 30/01; G06Q 30/0623; G06F 3/167
See application file for complete search history.

(56) References Cited

U.S. PATENT DOCUMENTS

| | | | | |
|---|---|---|---|---|
| 8,867,708 B1* | 10/2014 | Lavian | ............... | H04M 3/493 710/63 |
| 9,747,630 B2* | 8/2017 | Mierle | ............... | G06Q 30/0623 |
| 2006/0034270 A1* | 2/2006 | Haase | ............... | H04M 7/1285 370/389 |
| 2009/0030708 A1* | 1/2009 | Glasglow | ........... | G06Q 30/0643 705/300 |

(Continued)

OTHER PUBLICATIONS

Janga, S. "Expediting and Enhancing User Interaction with Interactive Voice Response Systems Utilizing Machine Learning", Technical Disclosure Commons. (Year: 2019).*

(Continued)

*Primary Examiner* — Kelly S. Campen
*Assistant Examiner* — Katherine A Barlow
(74) *Attorney, Agent, or Firm* — Platinum Intellectual Property PC

(57) ABSTRACT

A method and system for controlling a GUI on a user's network-connected device, the control being provided by a telephone call between the user and a speech recognition and speech synthesis system. An example of a restaurant ordering system is provided. The user calls a phone number and is guided through a verbal ordering process that includes one or more of: adding an item, deleting an item, changing quantities, changing sizes, and changing details of an item. The user's choices are added to a display so that a current status of the order is visible to the user. The GUI is updated as changes are made to the order. The GUI can also request additional information, upsell items, and show menus. The (Continued)

GUI aids the user in confirming that the order is correct. The system provides the final order to a restaurant for fulfillment.

16 Claims, 20 Drawing Sheets

(56) References Cited

U.S. PATENT DOCUMENTS

| | | | | |
|---|---|---|---|---|
| 2010/0205053 | A1* | 8/2010 | Shuster | G06Q 20/385 |
| | | | | 705/40 |
| 2012/0185240 | A1* | 7/2012 | Goller | G10L 15/22 |
| | | | | 704/201 |
| 2015/0237189 | A1* | 8/2015 | Schultz | H04W 4/16 |
| | | | | 455/414.1 |
| 2018/0053192 | A1* | 2/2018 | Aroori | H04L 51/046 |
| 2018/0084110 | A1* | 3/2018 | Fraizer | H04L 63/0421 |
| 2018/0293983 | A1* | 10/2018 | Choi | G10L 15/1815 |
| 2019/0325481 | A1* | 10/2019 | Friborg, Jr. | H04W 4/14 |
| 2021/0090154 | A1* | 3/2021 | Michaelson | G06Q 30/0643 |
| 2021/0272183 | A1* | 9/2021 | Turnbull | G06Q 30/0635 |

OTHER PUBLICATIONS

Min-Jen, T. "VoiceXML dialog system of the multimodal IP—Telephony—The application for voice ordering service", Expert Systems with Applications, vol. 31, Issue 4, pp. 684-696, https://doi.org/10.1016/j.eswa.2006.01.010. (Year: 2006).*

Tsai, M. J. "The VoiceXML dialog system for the e-commerce ordering service," Proceedings of the Ninth International Conference on Computer Supported Cooperative Work in Design, Coventry, UK, pp. 95-100 vol. 1, doi: 10.1109/CSCWD.2005.194152. (Year: 2005).*

* cited by examiner

Provide Menu

Add item

Delete item

Change size of item

Change quantities of item

Ask for more information

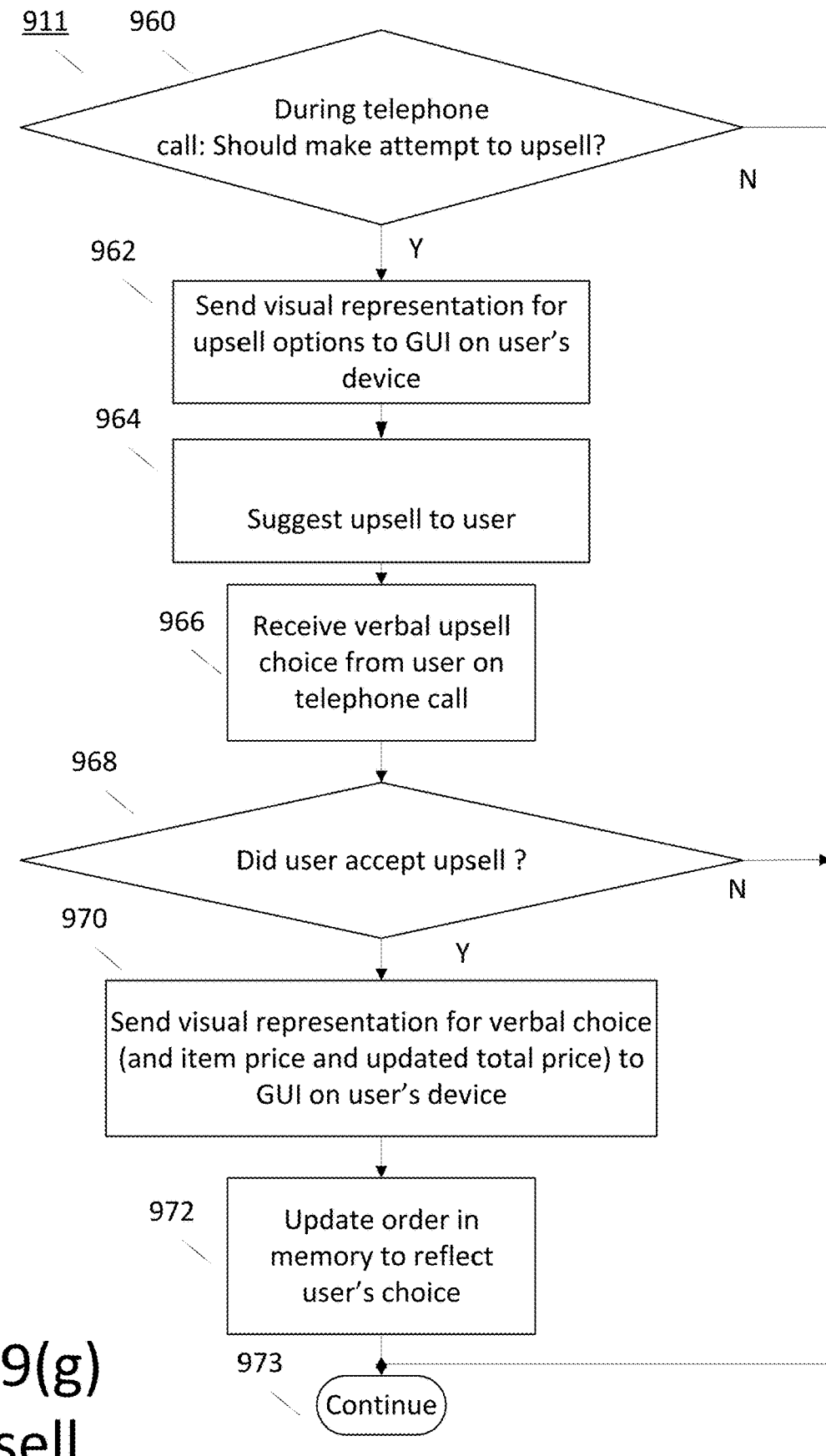
Fig. 9(g) Upsell

METHOD AND SYSTEM FOR CONTROLLING A GRAPHICAL USER INTERFACE BY TELEPHONE

TECHNICAL FIELD

The present invention relates to client devices that respond to spoken utterances and, more specifically, to providing a graphical user interface controlled by voice over a telephone.

BACKGROUND

Users are now able to control devices with spoken utterances. As an example, voice-controlled devices exist that receive a voice query or command, send the query or command as a voice request to a server in the cloud, and receive a substantive response from the server. The voice-controlled device then provides an audio response to the user's query or performs the user's command.

Interactive Voice Response (IVR) systems are commonly used by businesses to support and serve customers for frequent types of requests. However, IVR systems can be slow to use. If, for example, a user provides a phone number verbally to an IVR system, the system will often repeat the phone number back to confirm that the digits of the phone number were recognized correctly. The system will then ask the user if the digits were recognized correctly ("Say yes if this phone number is correct."). Verbal verification and confirmation can seem slow and cumbersome to a user.

SUMMARY OF THE INVENTION

Embodiments of the invention communicate with a user via a telephone call and displays information relating to the telephone conversation on a GUI of a device of the user. In one example, described below, the phone call is made on a mobile phone and the GUI is also displayed on the mobile phone. Other examples use other combinations of devices. Use of a GUI allows a system to skip verbally confirming choices made by a user and shows the choices via the ID. Showing information on a GUI visible to a user during a telephone call with the user allows the user to have a much smoother experience.

One embodiment of the present invention comprises a computer-implemented method, comprising: receiving a telephone call from a user to a computer system; receiving a first choice verbally from the user during the telephone call, the first choice being recognized by automatic speech recognition; and sending to a network-connected device for display, during the telephone call, an output based on the verbally received first choice.

One embodiment of the present invention is a restaurant ordering system, comprising: a dynamic GUI web page stored in a memory of the ordering system, a link to the dynamic GUI web page, and order information reflecting a current state of a restaurant order; and software stored in a memory of the ordering system and executed by a processor to perform: communicating with a phone call connector to conduct a phone call with a user; the user providing a verbal choice relating to the restaurant order during the phone call, sending the dynamic GUI page to a web browser of the user, sending visual data to the dynamic GUI page on the user's web browser to reflect the user's verbal choice so that the dynamic GUI reflects a current state of the restaurant order, receiving audio information for the user's verbal choice, speech recognition on the received audio information to yield recognized speech, and creating, in accordance with the recognized speech, visual data to be sent to the dynamic GUI page.

One embodiment of the present invention is a restaurant ordering system, comprising: communicating with a phone call connector to conduct a phone call with a user, the user providing a verbal choice during the phone call; receiving audio information for the user's verbal choice; performing speech recognition on the received audio information to yield recognized speech; creating, in accordance with the recognized speech, visual data based on the user's verbal choice; and sending the visual data to a dynamic GUI on the user's device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9(g) is a flowchart of one embodiment of using voice and visual upsell options during the telephone call.

DETAILED DESCRIPTION

Figure 1A:
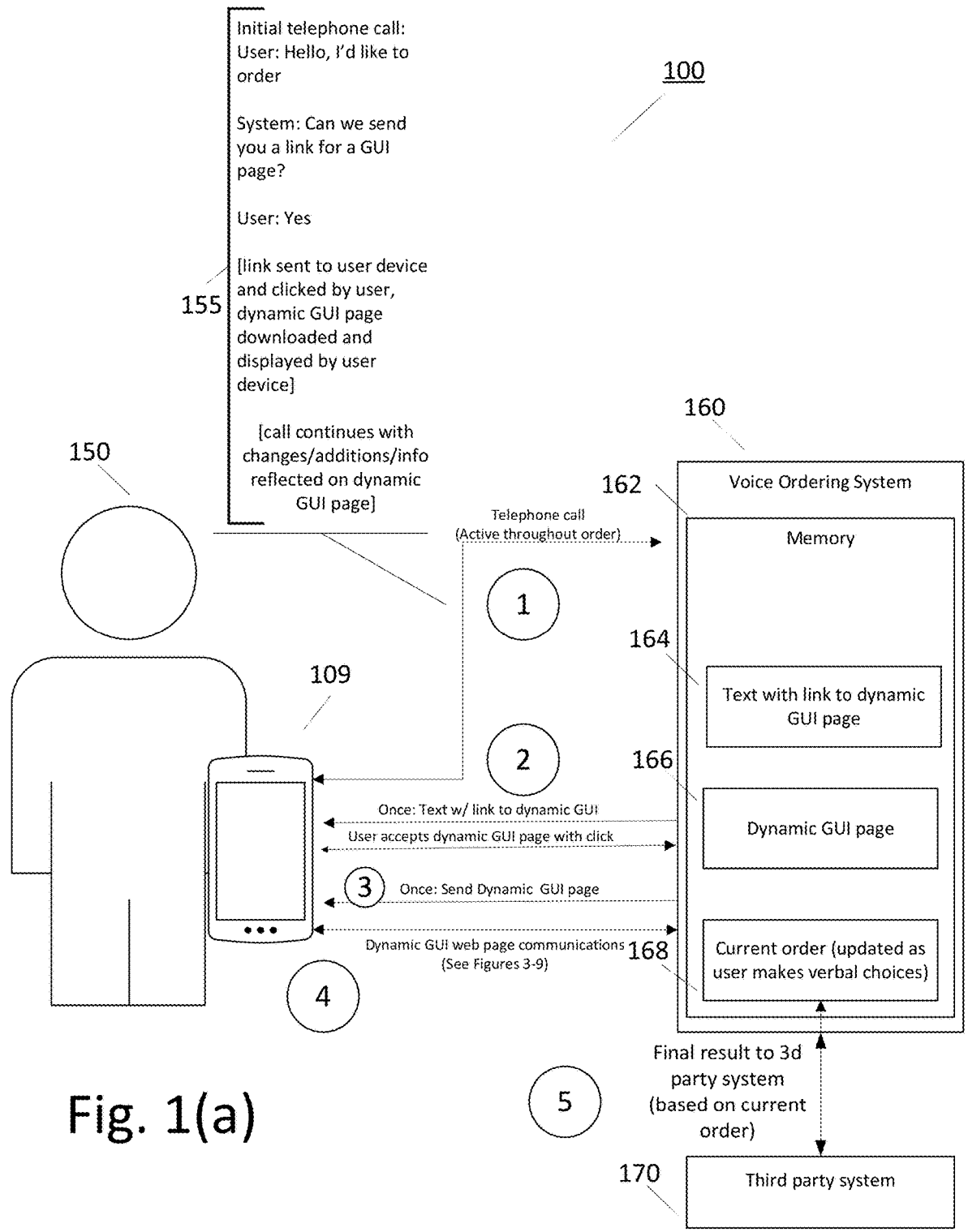
FIG. 1(a) is a system diagram of an embodiment of the interactive voice/GUI system.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be used and that logical, mechanical, electrical, functional, and other changes may be made without departing from the scope of the present invention. The following detailed description is, therefore, not to be taken in a limiting sense, and the scope of the present invention is defined only by the appended claims.

A. Overview

The human visual system can receive information at higher throughput than the human auditory system. For example, a user can choose the best of ten web search results from a browser window in seconds, whereas it would take minutes to hear all of the results read out and then make a choice. Similarly, it may take ten minutes to read out a restaurant menu to a user while a written menu can be reviewed in much less time. Imagine trying to shop around and get reviews of products by voice with no screen before placing an online order with Amazon.com.

Moreover, accepting verbal input from a user requires confirmation from the user that what the system thinks it heard is accurate. In many Interactive Voice Response (IVR) systems, once the user makes a choice verbally, good practice says that the system should repeat the user's choice and ask for confirmation. For example, "We believe you entered the phone number 555-555-5555. Enter 1 for yes and 2 for no." Many users find it annoying to listen to the phone number they just entered even though confirmation is necessary for proper operation of an IVR system. Similarly, if a user is ordering from a menu verbally, it would take a longtime to read back the order and get confirmation for each item.

The embodiments discussed herein allow a user to verbally place an order, or have another interaction, over a voice call, such as a telephone call. Not all users are comfortable with placing orders online using a web page, for example. Using a voice call is more intuitive for some users. Embodiments described herein allow the user to visually review data received over the telephone instead of having the data read back verbally.

Embodiments disclosed herein provide companies access to a full suite of industry-ready tools "pre-built" to add value through minimum effort. Key features include pre-built domains relevant to the company and industry, pre-set commands that align with the majority of use cases, easy upload of custom data into relevant domains, custom commands tailored to use cases, clear documentation for integration into hardware or software, access to service and support via dedicated resources, and simple pricing based on monthly minimums and query volume. These features provide the benefits of faster implementation and time-to-market for target companies and requiring lower skill, more control over the end solution, no/less upfront non-recurring engineering (NRE) costs, confidence in the ongoing improvement of the platform in delivering new features and value, ability to achieve a higher margin (vs providing only core tools with lower margins and more competition).

B. Example of a Restaurant Ordering System

The following example describes a system and method used to place restaurant orders. It will be understood that the present invention may be used in other types of applications such as ordering from other stores, gas stations, interacting with banks or other services, and should not be considered limited to use in restaurants.

FIG. 1(a) is a system diagram of an embodiment of the interactive voice/GUI system. FIG. 1(a) shows a user 150 with a device 109. The example below will be described assuming that device 109 is a smart phone, although other devices could be used as well. Device 109 can be a mobile phone, a telephone calling application executing on a computer, a video chat application executing on a data processing device having a display, or any other device or combination of devices that allows voice communication between an entity, such as a human, and system 160. In one embodiment, the user uses two devices, such as a landline along with a separate device capable of displaying a message and a dynamic GUI.

The diagram of FIG. 1(a) shows five sequential processes, designated by numbers: Numeral 1: a voice call placed by device 109 to a voice ordering system 160; Numeral 2: sending a message with a link to the device 109; Numeral 3: loading a dynamic GUI page into the user's device, in response to the user clicking on the message; Numeral 4: communicating between the dynamic GUI page and the voice ordering system; and Numeral 5: sending a final version of the interaction to a third party system, for example to a restaurant to place the order with the restaurant.

In FIG. 1(a), an interaction 155 is started by the user placing a phone call using, for example, device 109. In one embodiment, the phone call is to a designated phone number that calls a voice ordering system 160 to place orders in any one of multiple restaurants handled by voice ordering system 160. Alternately, each restaurant could have its own phone number in the system so the user chooses a restaurant merely by dialing the phone number associated with that restaurant in the voice ordering system. As noted above, the call may be to another type of entity, not a restaurant. In one embodiment, as illustrated in FIG. 1(a), the initial telephone call 155 goes something like:

User: Hello, I'd like to order.
System: Can we send you a link for a GUI page?
User: Yes In FIG. 1(a), an interaction 155 is started by the user placing a phone call. Then, system 160 sends a message 164 (text, email SMS, MMS, etc.) to device 109 with a link, and requests that the user click the link to download a dynamic GUI page 166 from a memory 162 of voice ordering system 160 to device 109. As discussed below, page 166 contains a script such as one written in the JavaScript, or HTML5 language or as a node.js runtime that communicates with system 160, for example, over a network such as the Internet. The dynamic GUI web page 166 is provided to the user in response to clicking the link in the message. In one embodiment, the dynamic GUI web page and its contained script are stored in memory 162 until it is sent to device 109.

Then, in one embodiment, as shown in connection with numeral 3, a browser of device 109 displays dynamic GUI page 166. The GUI page is called "dynamic" because the GUI page changes as user choices are verbalized by the user via the telephone call. As the telephone call continues, activities by the user in the telephone call are used to communicate with the dynamic GUI web page to display data relating to the interaction in visual form, as discussed below.

It will be understood that the process may include a variety of inputs from the user and updates to the output of the dynamic GUI page as the user speaks on the telephone call. In one embodiment, the result of the interaction is stored in the voice ordering system, as it is updated through the user's interactions with the system. As noted above, the result of the interaction may be an order to a restaurant.

When the user is done entering their order and has finalized the interaction, a final result based on current order 168 from the memory 162 is sent to third party system 170, in one embodiment. In the example above, the third party is the restaurant ordering system, which passes the order to employees at the restaurant who prepare and possibly deliver the order.

Figure 1B:
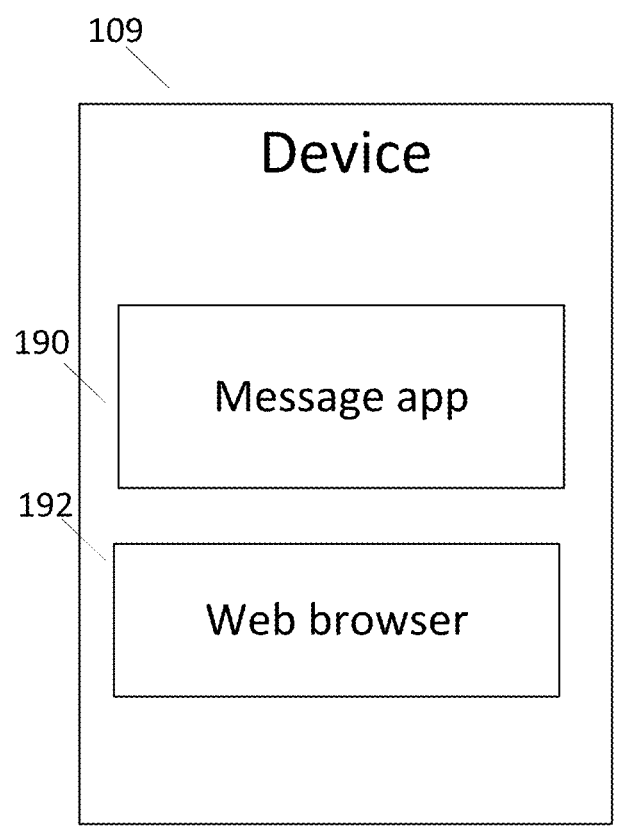
FIG. 1(b) is a block diagram of device showing a message app and a web browser of device.

FIG. 1(b) is a block diagram of device 109 showing a message app 190 such as a texting app, SMS app, or similar. FIG. 1(b) also shows a browser 192 in device 192. In one embodiment, browser 192 is used to display dynamic GUI page 166.

Figure 2:
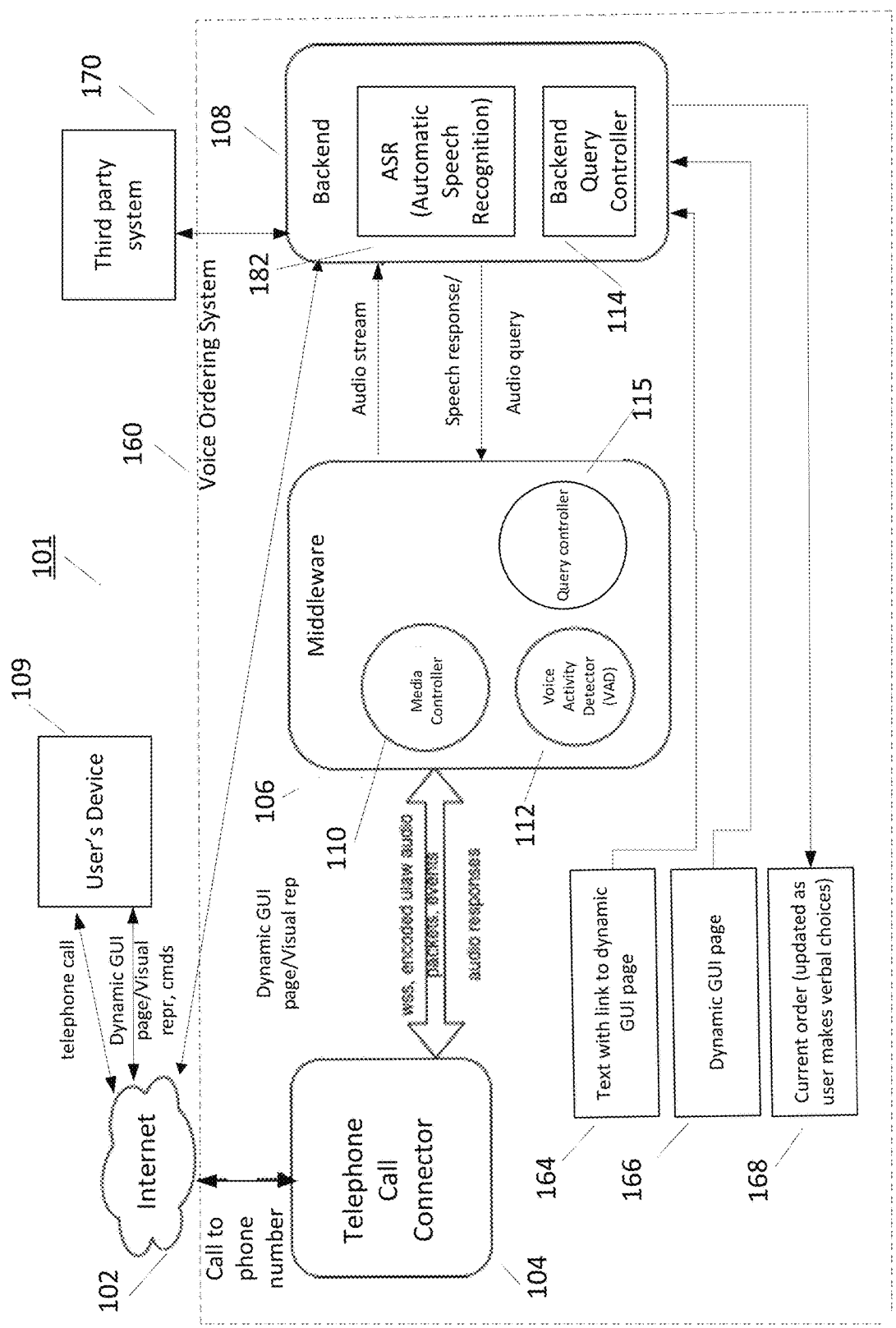
FIG. 2 is a block diagram of a voice ordering system.

FIG. 2 is a block diagram 101 of voice ordering system 160 and elements that communicate with system 160. Voice ordering system 160 communicates with a network 102 such as the Internet. Also shown in FIG. 2 is device 109, which connects to network 102, such as the Internet. In one embodiment, the phone call can also be placed all or partly via the POTS (plain old telephone system) or a cellular network, either of which connect with an appropriate telephone call connector 104. Also shown is a third party system 170, which, in some embodiments, connects to network 102, such as the Internet. In the described embodiment, middleware 106 communicates with telephone call connector 104. Telephone call connector communicates with device 109 to facilitate phone calls between system 160 and device 109. In the described embodiment, system 160 includes a telephone call connector 104 and middleware 106, which comprises a media controller 110, a voice activity detector 112, and a query controller 115 to communicate with backend 108. In one embodiment, phone call connector 104 may be a third party product, such as a product from Twilio, which is a digital telephone service that connects calls received via a network 102, with a client application. The phone call connector sends packets containing the received digital phone call to media controller 110, which converts audio packets in digital PCM to way formats, and streams the audio to backend 108.

Backend 108 comprises ASR (Automatic speech recognition) 182 and a backend query controller 114. In one embodiment backend 108 communicates with device 109, and third party system 170. In one embodiment, backend 108 sends the message to the user's device 109 and further sends the dynamic GUI to device 109. In one embodiment, services incorporated in backend 108 process the audio request, and based on the restaurant and user information generates audio responses for the dynamic GUI.

In one embodiment, backend 108 comprises the Houndify Automatic Speech Recognition (ASR) Platform 108, available from SoundHound, Inc., although other appropriate speech recognizers could be used.

Backend 108 communicates with a message app on device 109 to send the initial message containing a link to the dynamic GUI page, which is loaded from memory 162 to a browser of device 109. In one embodiment, this communication is achieved via an API which allows backend 108 to send commands and visual representations of data to a script on the dynamic GUI page to control the dynamic GUI page.

Figure 3:
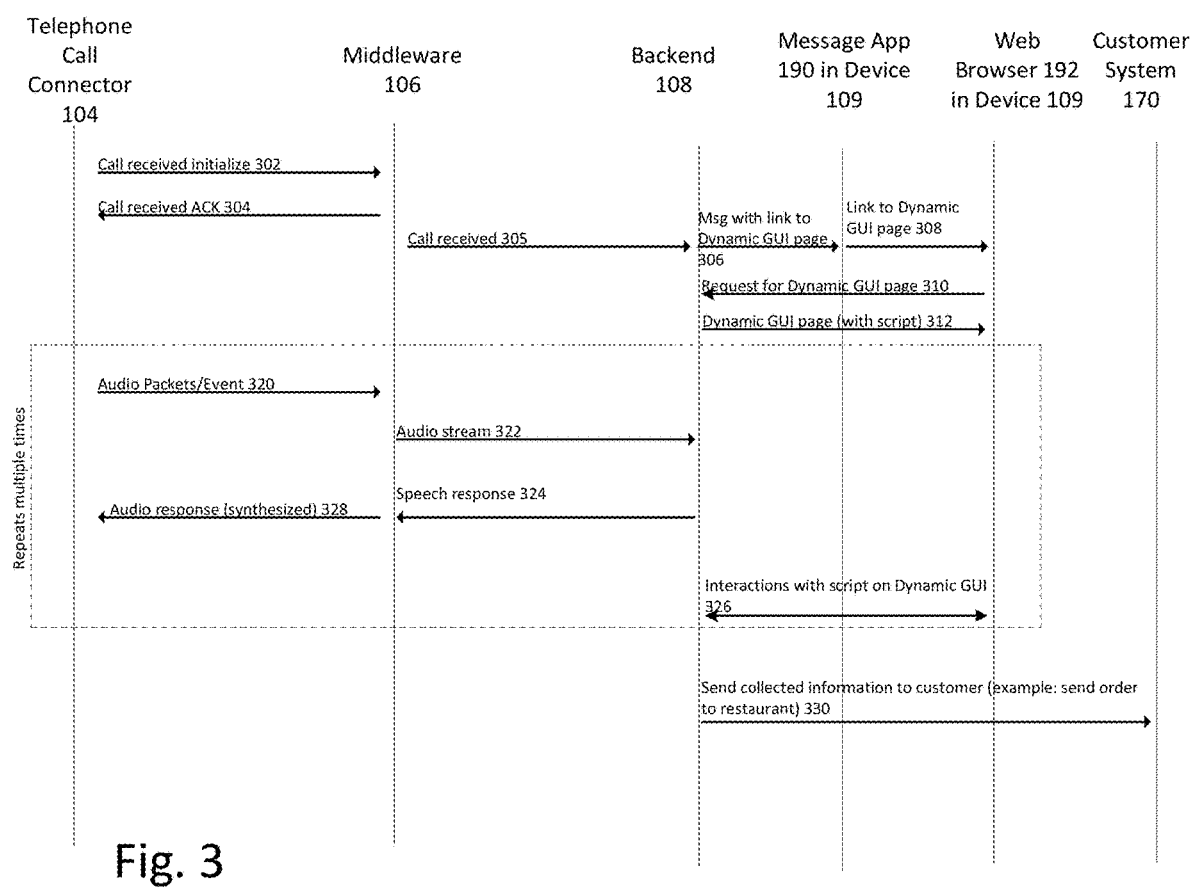
FIG. 3 is a signal diagram showing one embodiment of the data passing between entities of the system.

FIG. 3 is a signal diagram showing one embodiment of the data passing between entities of the system. The entities shown in FIG. 3 comprise: telephone call connector 104, middleware 106, backend 108, a message app in device 109, a web browser in device 109, and a third party system 170, such as, for example, an order system of a restaurant whose customers can order using the system and/or a third party delivery system to schedule physical delivery of the food. Once a call is placed and initially received by telephone call connector 104, initialization information 302, 304 passes between telephone call connector 104 and middleware 106. This initialization information varies depending on the implementation. This initialization process informs middleware 106 of the identity of device 109. An example of this identity is the phone number of device 109. Another example of this identity is a number usable to send a message to device 109.

When a call comes in, in one embodiment, middleware 106 informs 305 backend 108 that a call is initiated and backend 108 pushes 306 a message to device 109 using the identification information of device 109 received during initialization 302. The message includes a URL 308 to an HTTP web address that is unique. In some embodiments, the URL expires when the phone call ends. Many messaging apps recognize text with HTTP URLs and automatically convert them to hyperlinks that a phone user can click. The user can then click the URL link, which causes the phone to open a browser that requests 310 the URL. In one embodiment, the system initially gives the ordering customer an option to receive a link to order online. In this situation, the user is simply sent a link to an online ordering system of the restaurant and no further phone ordering, as described herein, is performed. In one embodiment (not shown), the message and dynamic GUI are sent to device 109 by middleware 106.

Note that users may decide to make their phone call "on speaker" so that they can easily see and tap the URL in the message when it arrives. Alternatively, the user may interact with the phone call by voice using a headset such as one that connects to the phone by a cord or a wireless communication protocol such as Bluetooth. The URL provides an HTML page 312 with for example, a JavaScript script which is sent to a browser in device 109 in response to request 310. The JavaScript script uses the unique URL to associate a GUI session with a call in to the backend 108. In one embodiment, the script connects 326 to backend 108 through web APIs to send and receive interactions 326 between the script and backed 108. The user is then able to speak to middleware 106 and then backend 108 through the telephone connection. Telephone call connector 104 sends audio packets/events 320 to middleware 106 reflecting voice from the telephone call. Middleware 106 streams 322 audio content to backend 108, which performs speech recognition and returns 324 a speech response to middleware 106. Backend 108 keeps track of the state of the phone call and generates the speech response to be sent to the user over the telephone. In one embodiment the speech response could be text format of the audio request, and also responses, in both text and audio format (via TTS) to be sent to the caller. The script in the dynamic GUI renders visual representations of information according to the interactions 326 between the script in the dynamic GUI and backend 108. Elements 320, 322, 324, 328, and 326 are usually repeated multiple times during interaction with the user. It will be understood that in some embodiments, middleware 106 and backend 108 can be combined or that their operations could be performed by a different part of system 160. In some embodiments, the operations of system 160 are distributed between multiple servers.

When the user's order is complete, backend 108 sends 330 collected information to third party system 170. As an example, a final order may be sent to a restaurant ordering system and/or to a system for scheduling physical food delivery.

C. Method Overview

Figure 8:
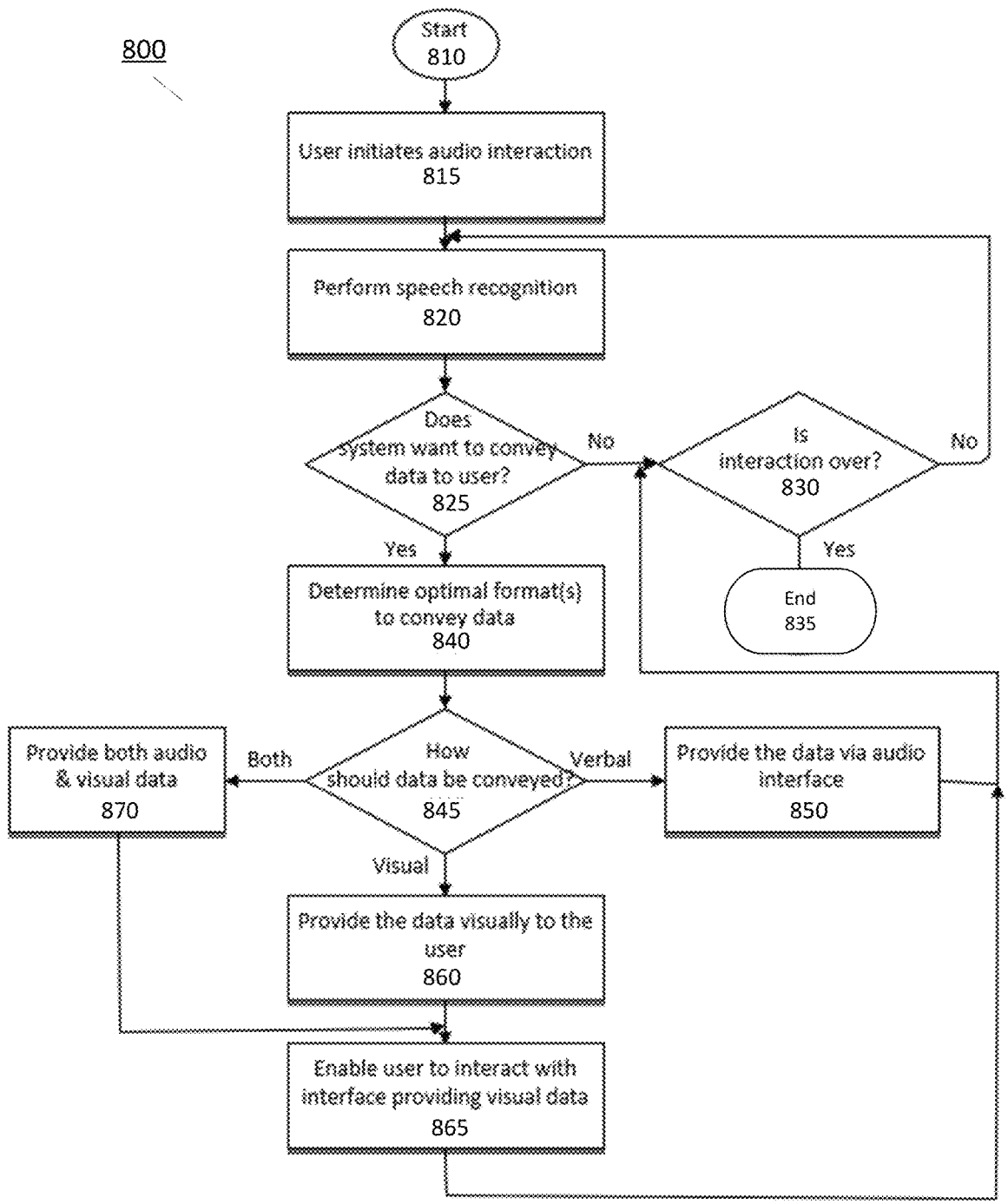
FIG. 8 is a flowchart of one embodiment of a method performed by an interactive voice/GUI system.

FIG. 8 is a flowchart 800 of one embodiment of a method performed by an interactive voice/GUI system. It should be noted that elements 815 and 820 are optional as communication between system 160 and the GUI is not always initiated by the user speaking during a telephone call.

Initially 810, during a telephone call, the user initiates 815 audio interaction, for example, by speaking on the telephone call. System 160 performs speech recognition on the audio interaction to convert the audio received from the telephone call to speech recognition data. In 825, system 160 determines whether it wants to convey information to the user. As discussed below in connection with FIGS. 4-7(*b*), the data conveyed may be confirmation of the user's audio interaction or may be conveyance of information that the user has not explicitly requested (such as an upsell or a request for additional information). If the system does not want to convey information to the user, if the interaction is over 830, processing ends 835. If the interaction is not over, control returns to 820.

If the user wants to convey data to the user, the system determines in 840 the optimal format(s) to convey data. In the described embodiment, data can be conveyed to the user as follows 845: as audio 850 (e.g., via synthesized speech on the telephone call), as visual data 860 (e.g., via the GUI), or as both 870 (e.g., via both synthesized speech on the telephone call and as visual data displayed on the GUI). In some embodiments, the GUI may also be used to show an advertisement, including, for example, a visual advertisement, or including, for example, a video advertisement with sound and moving video. In the described embodiment, if the data is provided visually, the system enables 865 the user to interact with the interface/GUI providing the visual data. Control then returns to 830.

Figure 4:
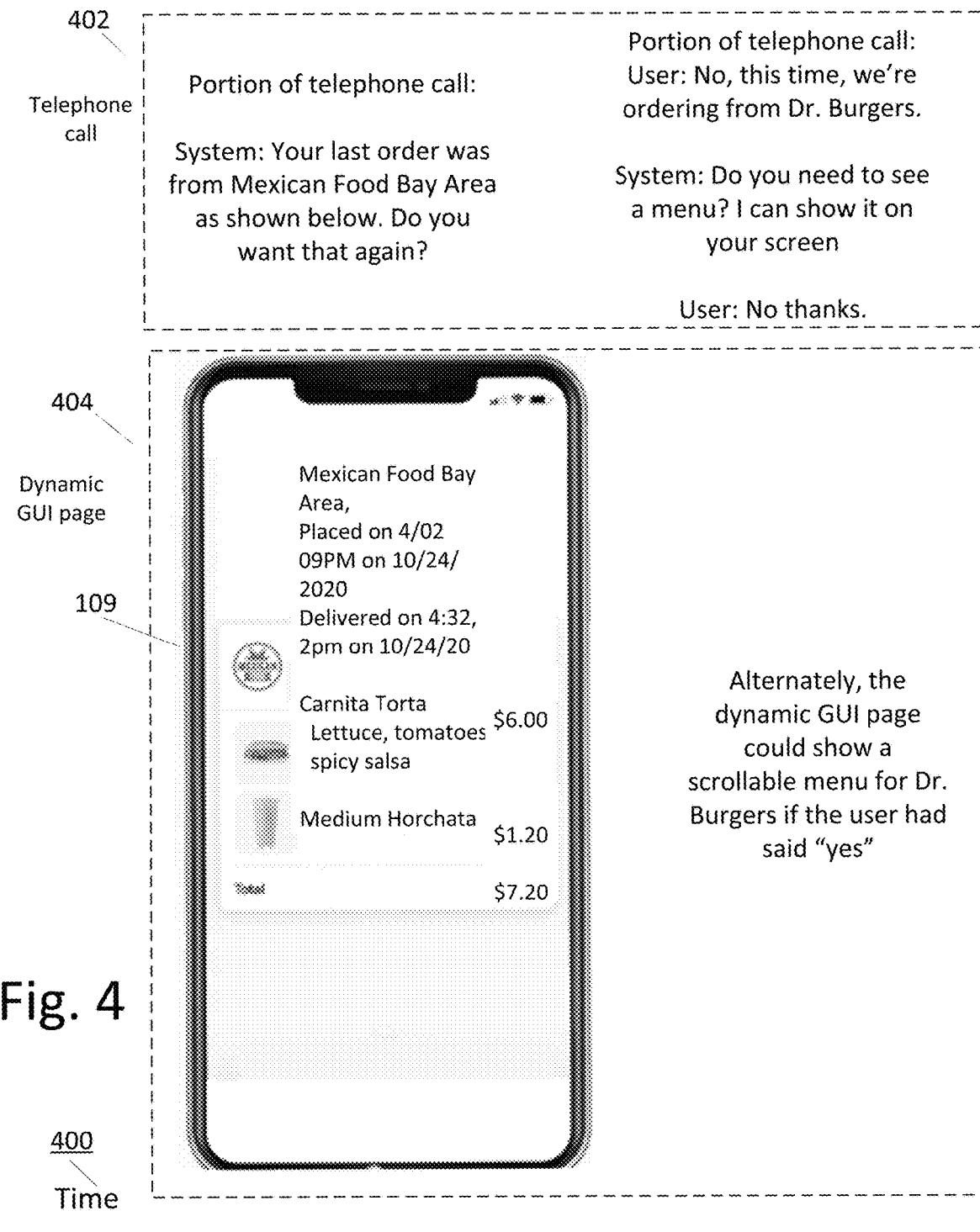
FIGS. 4-7(b) illustrate a timeline showing one embodiment of a telephone call between the voice ordering system and a user and further showing an example dynamic GUI page displayed on a device of the user.

In one embodiment, data that takes little time to convey as audio (for example, less than 5 seconds) is conveyed only as audio data. Short audio data will not annoy the user, where longer audio data may exceed the user's patience. If presenting the data as audio would take longer that a predetermined time (for example, 5 seconds or more), system 160 determines that the data should be displayed on the GUI and communicates with the dynamic GUI page to cause the data to be displayed there. FIG. 4 shows an example of such short-time data. When the user says they are ordering from Dr. Burgers, the system responds "Do you need to see a menu? I can show it on your screen." This short piece of data can be synthesized as audio for the phone call and does not need to be displayed on the GUI.

In one embodiment, data that is displayed as both audio and visual is shown in FIGS. 5(*a*) and 5(*b*). Once the user has added items to the order, system 106 asks during the telephone call "Does your order on the screen look ok?" In one embodiment of a restaurant ordering system, confirmation of orders is always done using both audio and visual data. In this case, the system synthesizes speech to ask "Does your order on the screen look OK and also shows the current order on the GUI. Using both audio and visual data makes sure that the user sees and understands the output. Displaying the details of an order visually saves the time that would be required to read the entire order. Some embodiments provide confirmation via voice and visual as discussed above whenever the order is changed. Audio and visual data outputs are not shown every time herein for purposes of clarity of explanation. FIGS. 6(*a*) and 6(*b*) show additional examples of output that is both audio and visual (choice of crispy vs. grilled and an attempted upsell to a larger drink).

D. Examples

Determining a Menu that the User Will Order from

FIGS. 4-7(*b*) illustrate a timeline showing a telephone call 402 between the system 160 and user 150 and further showing 404 an instance of a dynamic GUI page as displayed on a device 109. In all timelines in FIGS. 4-7(*b*), time progresses forward from left to right.

In the embodiments shown, the user is conducting the telephone call via device 109, which may be playing its audio "on speaker" to avoid the user having to move device 109 to and from their ear to both speak and view the screen. Alternatively, the user may interact with the phone call by voice using a headset such as one that connects to the phone by a cord or a wireless communication protocol such as Bluetooth. In the example, the dynamic GUI is being displayed on device 109. In other embodiments, the user is placing the call on device 109 while using another device that can receive messages and display web pages (such as a tablet or a laptop) to display the dynamic GUI. It should be noted that system 160 does not directly control which devices the user uses to place the phone call and view the GUI. The user may choose whichever devices make sense for the user. As an example, if the user can view the message 164, which has a link to the dynamic GUI page, on a laptop, the user may choose to do and click on the link so that the dynamic GUI is displayed on a browser of the laptop. Similarly, the user may choose to view the message and click through to the GUI on a cell phone, thus choosing to view the GUI on a cell phone. Similarly, the user may choose to place the phone call through a calling application on a computer, such as a tablet, laptop, or a home assistance device such as Amazon's Alexa or Google's Google Home.

The example timeline 400 of FIG. 4 begins with a telephone call 402 already in progress in which the user chooses a menu from which to order. In the example, voice ordering system 160 asks the user over the telephone if they want to order the same thing, they ordered last time. Voice ordering system 160 then communicates with the dynamic web page to send 404 the GUI shown in FIG. 4, showing the user's previous order, including items prices and total price, to remind the user what they had previously ordered (which in this example is from "Mexican Food Bay Area.") Note that in some embodiments, the user may also make a verbal request on the telephone call to see their most recent order, in which case it is displayed on the GUI as shown in FIG. 4. In other embodiments, the system may show the most recent order on the GUI without prompting from the user (as occurs in FIG. 4). In the example of FIG. 4, the user says during the telephone call 402 that they do not want to reorder and also that they do not want to view a menu from any restaurant because they already have a restaurant in mind ("Doctor Burgers"). In the example, if the user had said that they wanted to see a menu, the GUI would show a scrollable menu for Doctor Burgers in the GUI. Thus, at the end of the timeline of FIG. 4, Voice ordering system 160 knows which restaurant the user wants to order from.

FIG. 9(*a*) is a flowchart 900 of one embodiment of providing a menu during the telephone call. During the phone call, if system 160 determines that the user wants to see a list of what they ordered last time from this restaurant (902), system 160 sends a visual representation of the previous order to the GUI on device 109 (904). During the phone call, if system 160 determines that the user wants to see a menu from a particular restaurant (906) system 160 sends a visual representation of the previous order to the GUI on device 109 (908), system 160 send a visual representation of the menu to the GUI on device 109(908). In both 904 and 908, some embodiments may also determine to provide an audio output during the phone call alerting the user that a menu is being displayed on the GUI. As discussed above, the entire menu would not normally be read out during the phone call as it would take too long a time to do so.

Adding Initial Items

Figure 5A:
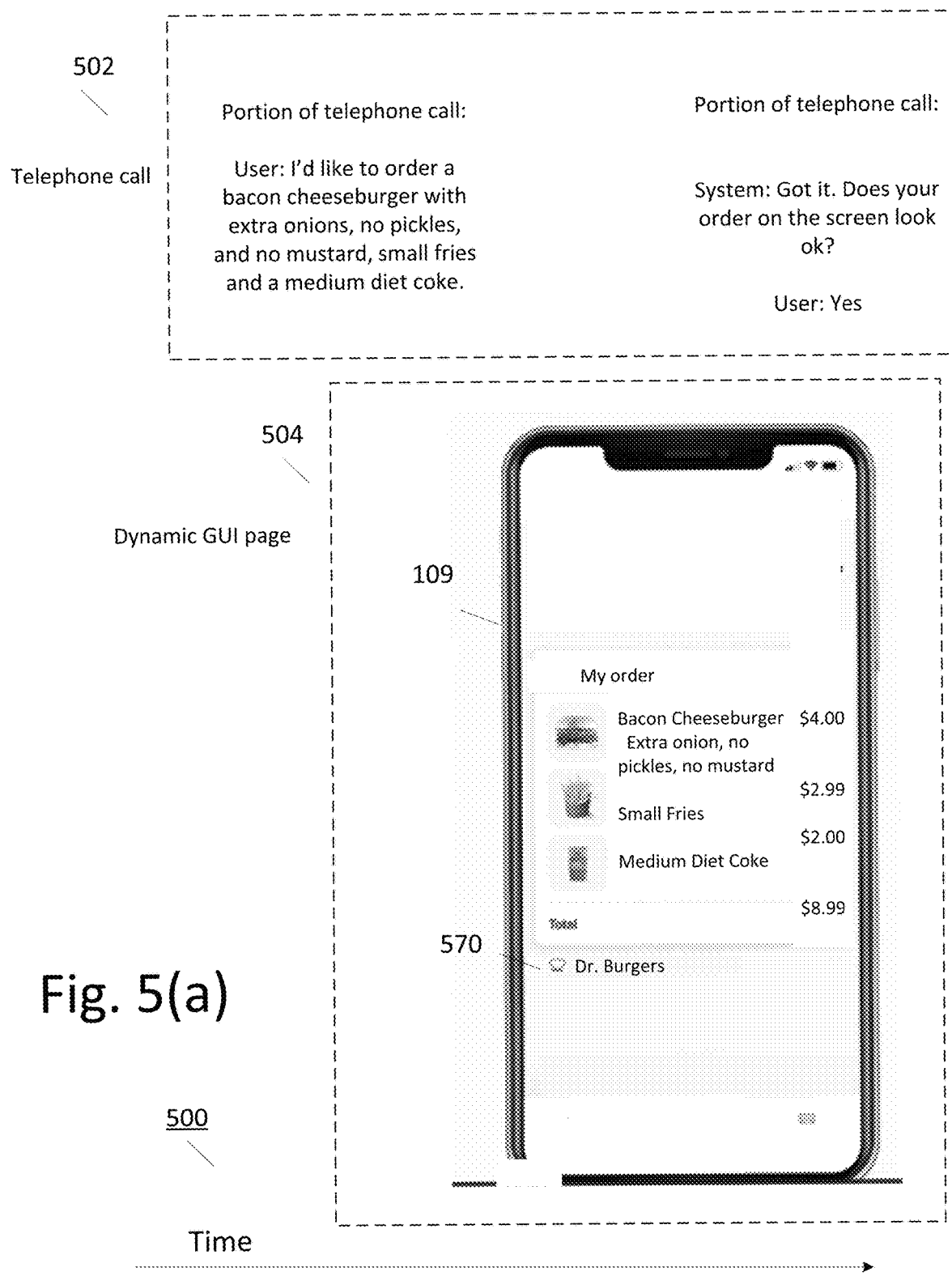
Figure 5B:
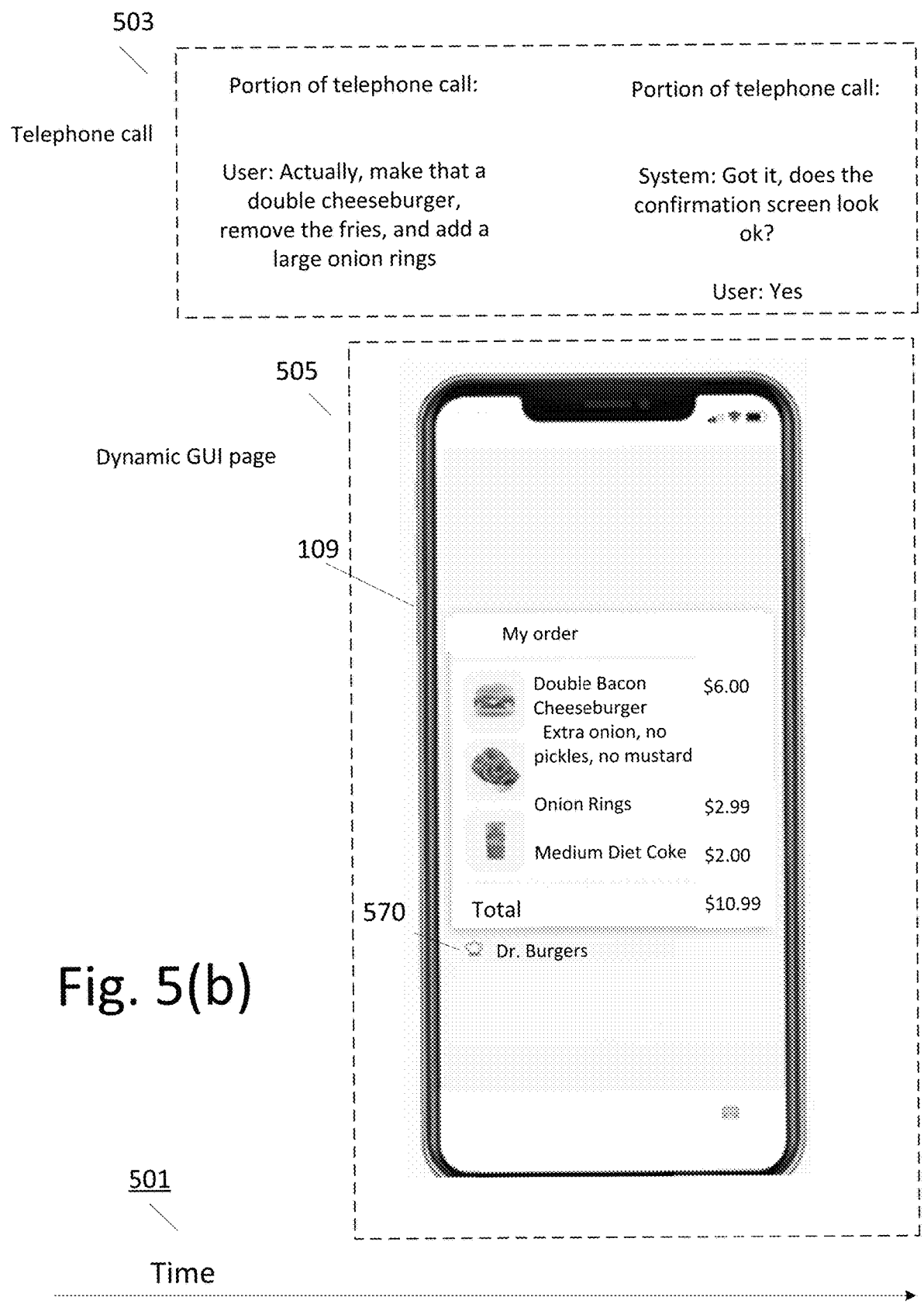

FIGS. 5(a) and 5(b) show timelines 500 and 501 that are a continuation of the timeline of FIG. 4, showing a telephone call 502, 503 between voice ordering system 160 and user 150 and further showing multiple dynamic GUI pages 504, 505 displayed on device 109 throughout the timeline.

In phone call 502, the user states that they would like to add items to their order, specifically that they would like to add a bacon cheeseburger with extra onions, no pickles, and no mustard, small fries, and a medium diet coke. System 160 updates the GUI on device 109 to show visual data for the user's current order. The current order in one embodiment includes a price for each item ordered, a quantity for each order (here implied to be one) and a total price for the order (here $8.99). By allowing the user to visually verify the accuracy of the voice order, the process is sped up, and made more intuitive.

In phone call 502, the system asks the user verbally if the order on the screen looks accurate. In this example, the user says during the telephone call that it does.

It should be noted that the described embodiment provides a way to avoid one of the problems associated with voice ordering—confirmation. In this example, the system takes the order by voice but does not need to read the order back to the user so that the user can confirm the order's accuracy. By showing the current order on device 109, including current prices, the system allows the user to visually check that the order is correct and to confirm by voice on the telephone call. In this example, the use of small pictures of each of the food items (the photos being provided by the restaurant) makes visual confirmation even easier for the user.

In phone call 503 of FIG. 5(b), the user further states that they would like to change an item already in their order, specifically that they would like to change the bacon cheeseburger to a double bacon cheeseburger and change the fries to a large onion rings. System 160 updates the GUI on device 109 to show visual data for the user's current order. The current order in one embodiment includes a price for each item ordered, a quantity for each order (here implied to be one) and an updated total price for the order (now $10.99 due to the change). By allowing the user to visually verify the accuracy of the voice order, the process is sped up and made more intuitive. During phone call 503, the system again asks the user verbally if the order on the screen looks accurate. In this example, the user says during the telephone call, that it does.

In some embodiments, a customer of voice ordering system 160 (as opposed to a user placing orders) can provide or specify information such as logos, web formats for pages, menus, pries, photos, coupons, upselling criteria, etc. to customize the appearance and/or the functioning of system 160. In one embodiment, this information is stored in memory 162. In the example, the customer is the owner/manager of Dr. Burgers restaurant and has provided a logo 570 to be included on dynamic GUI page 166 for Dr. Burger order summaries. In this example, logo 570 is a line drawing of a chef's hat and the words "Dr. Burgers" with a colored hatband and is stored in memory 162. In other embodiments, dynamic GUI page 166 may contain some or all of customer-provided logos, web formats for pages, menus, pries, photos, etc. The provided upselling criteria can be used to determine when to upsell to users as discussed below in connection with FIGS. 6(a), 6(b) and 9(g).

Figure 9A:
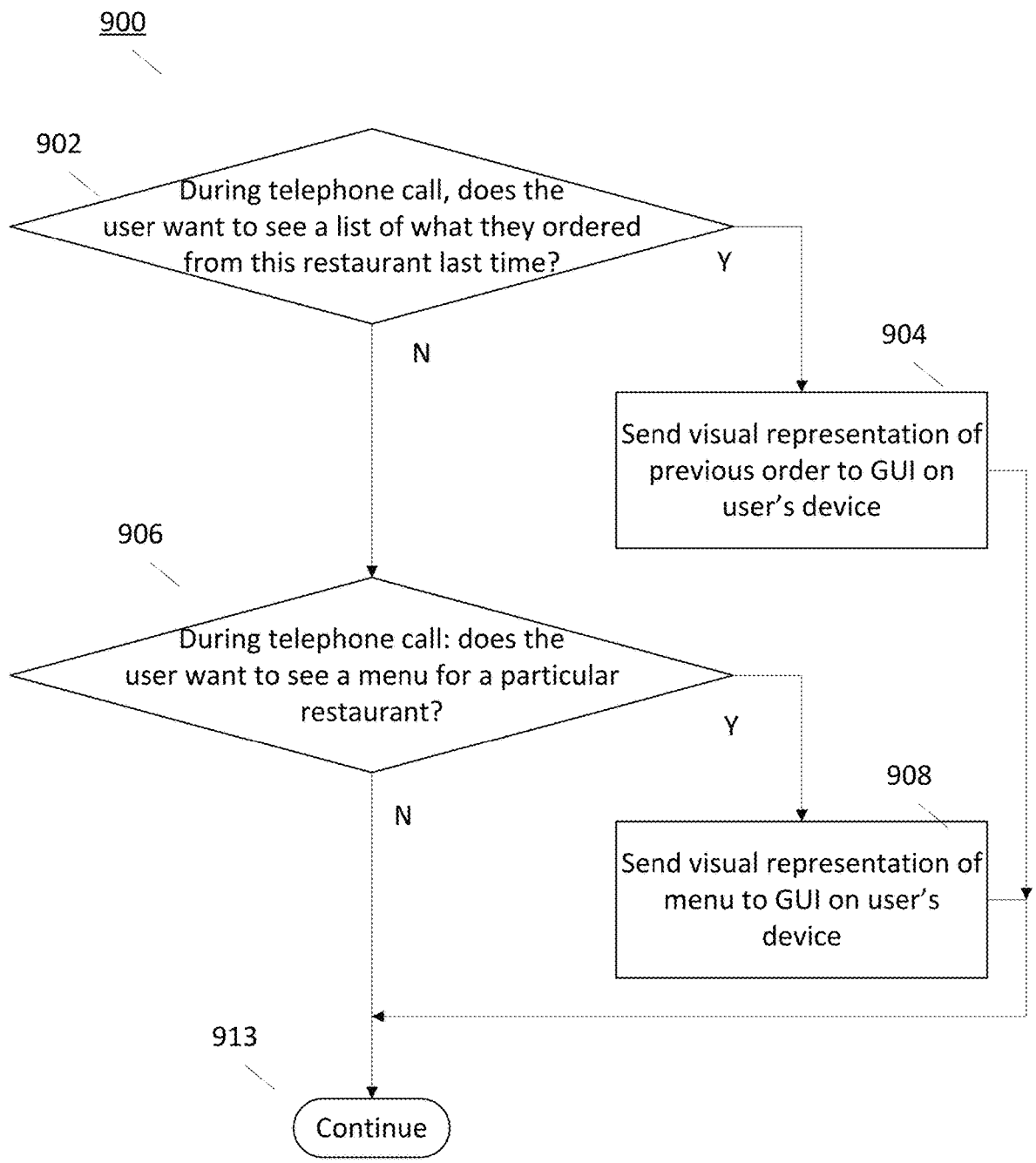
FIG. 9(a) is a flowchart of one embodiment of selectively providing a visual menu during the telephone call.
Figure 9B:
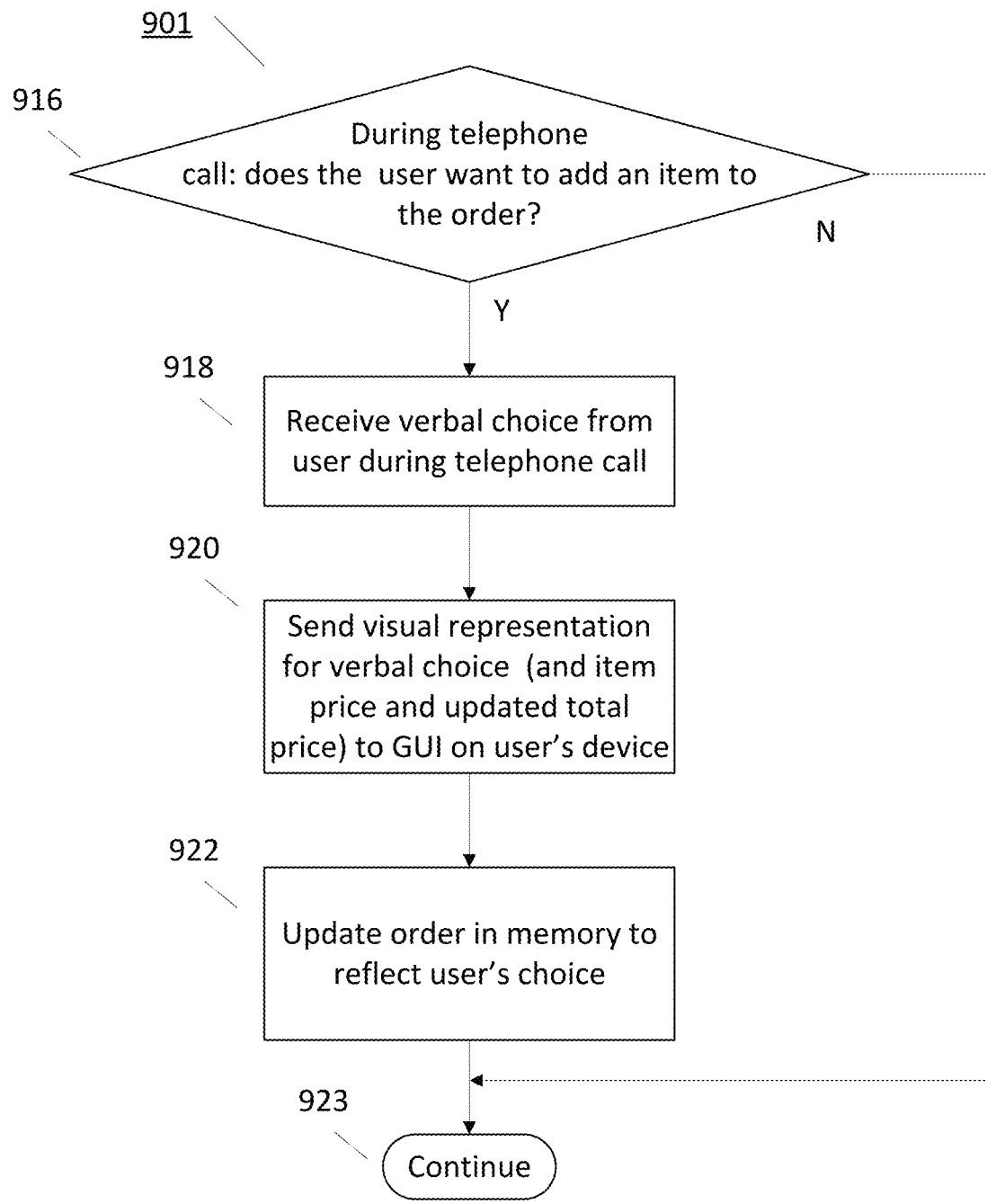
FIG. 9(b) is a flowchart of one embodiment of visually displaying the result of a selection during the telephone call.
Figure 9C:
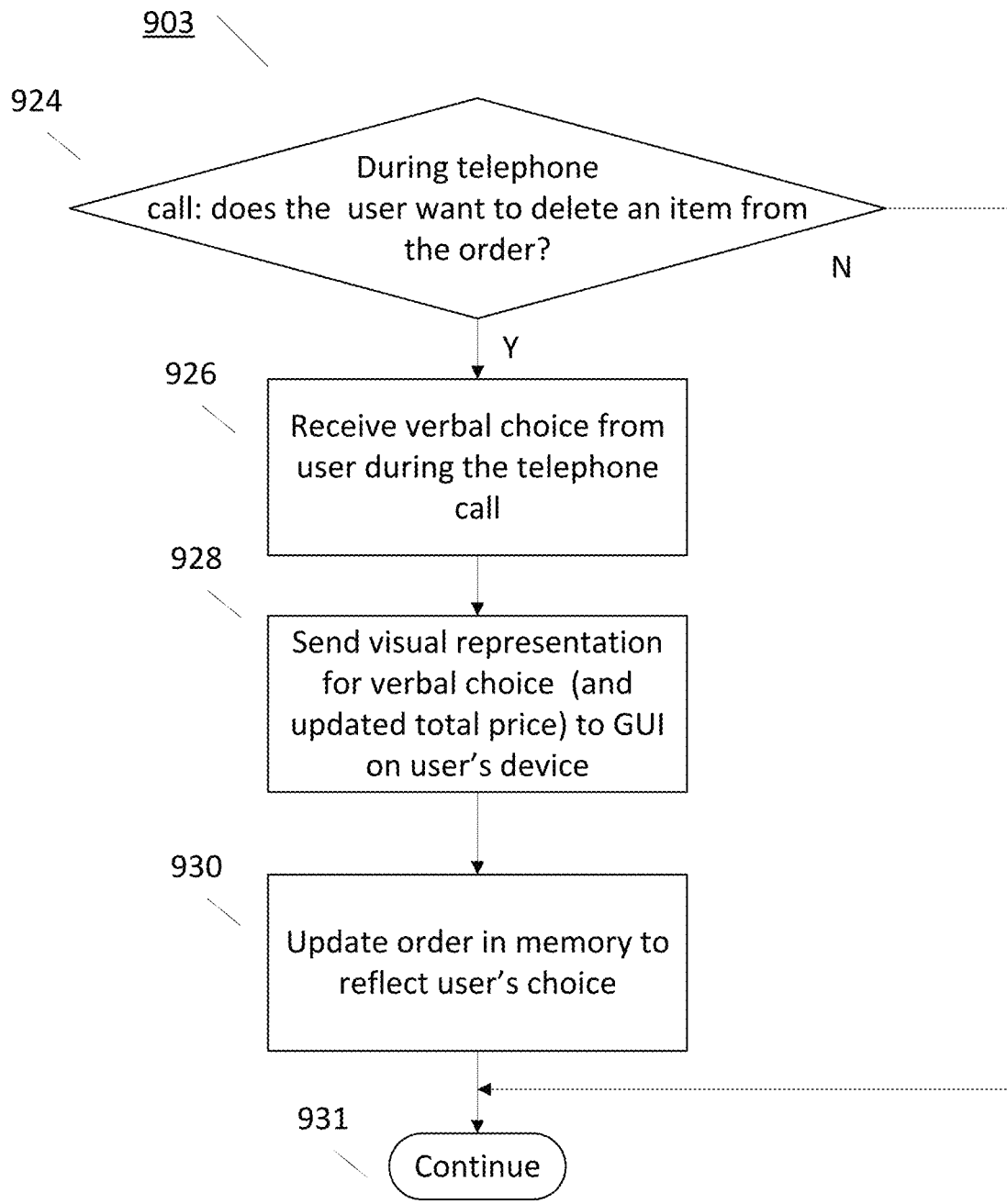
FIG. 9(c) is a flowchart of one embodiment of visually displaying the result of a deletion selection during the telephone call.
Figure 9D:
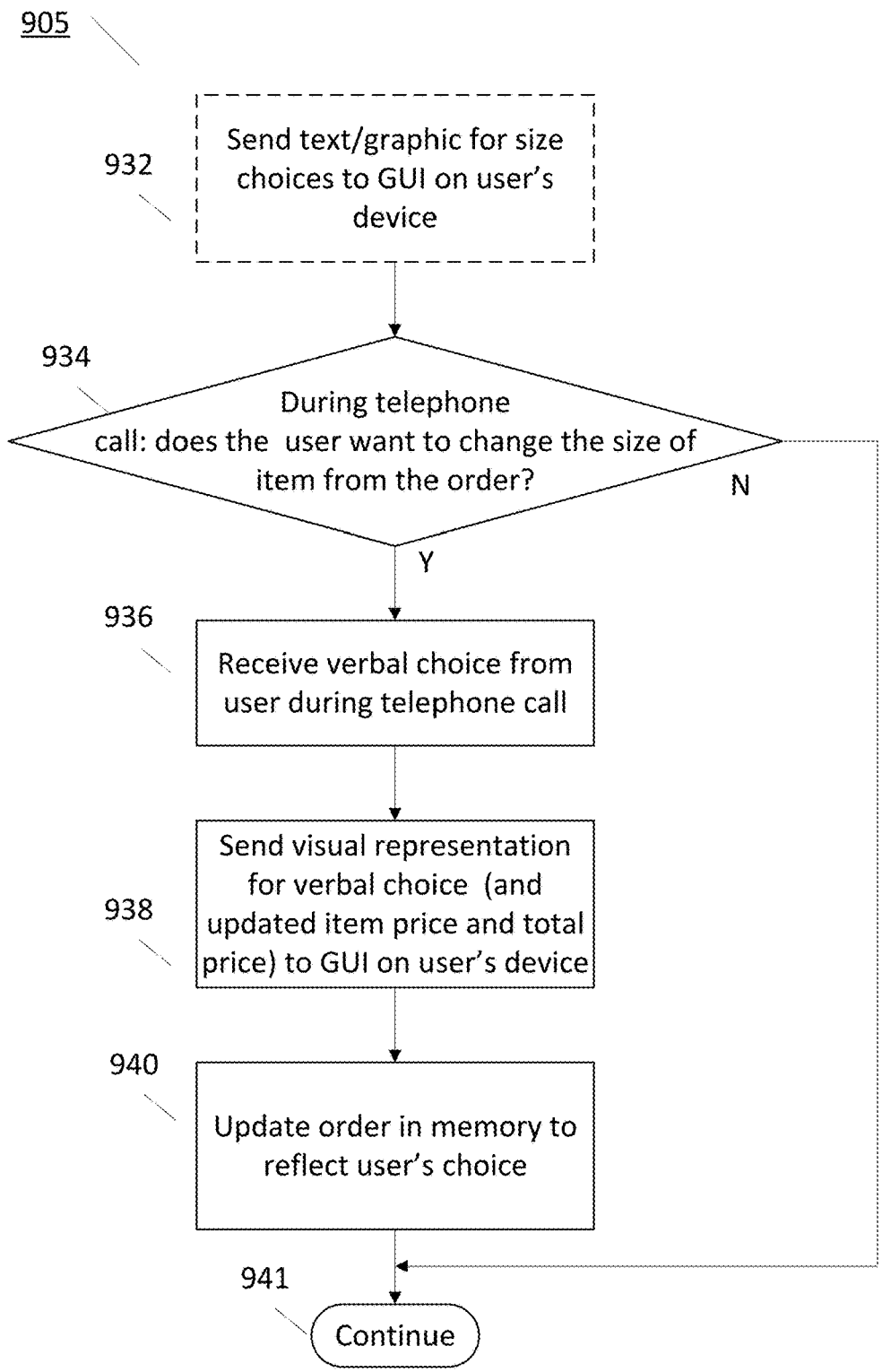
FIG. 9(d) is a flowchart of one embodiment of visually displaying a change to an item during the telephone call.

FIG. 9(b) is a flowchart 901 of one embodiment of adding an item during the telephone call. During the phone call, if system 160 determines 916 that the user wants to add (or change) an item in the order, system 160 sends a visual representation of the previous order to the GUI on device 109. If the user wants to make an addition or change, system 160 receives 918 a verbal choice from the user during the telephone call. System 160 sends 920 a visual representation for the verbal choice to the GUI on the user's device 109. Next, at 922 system 160 updates the order in memory to reflect the user's choice, and processing continues in 923. As discussed above, the entire change or addition would not normally be read out during the phone call as it would take too long a time to do so.

Requesting Additional Information by the System

Figure 6A:
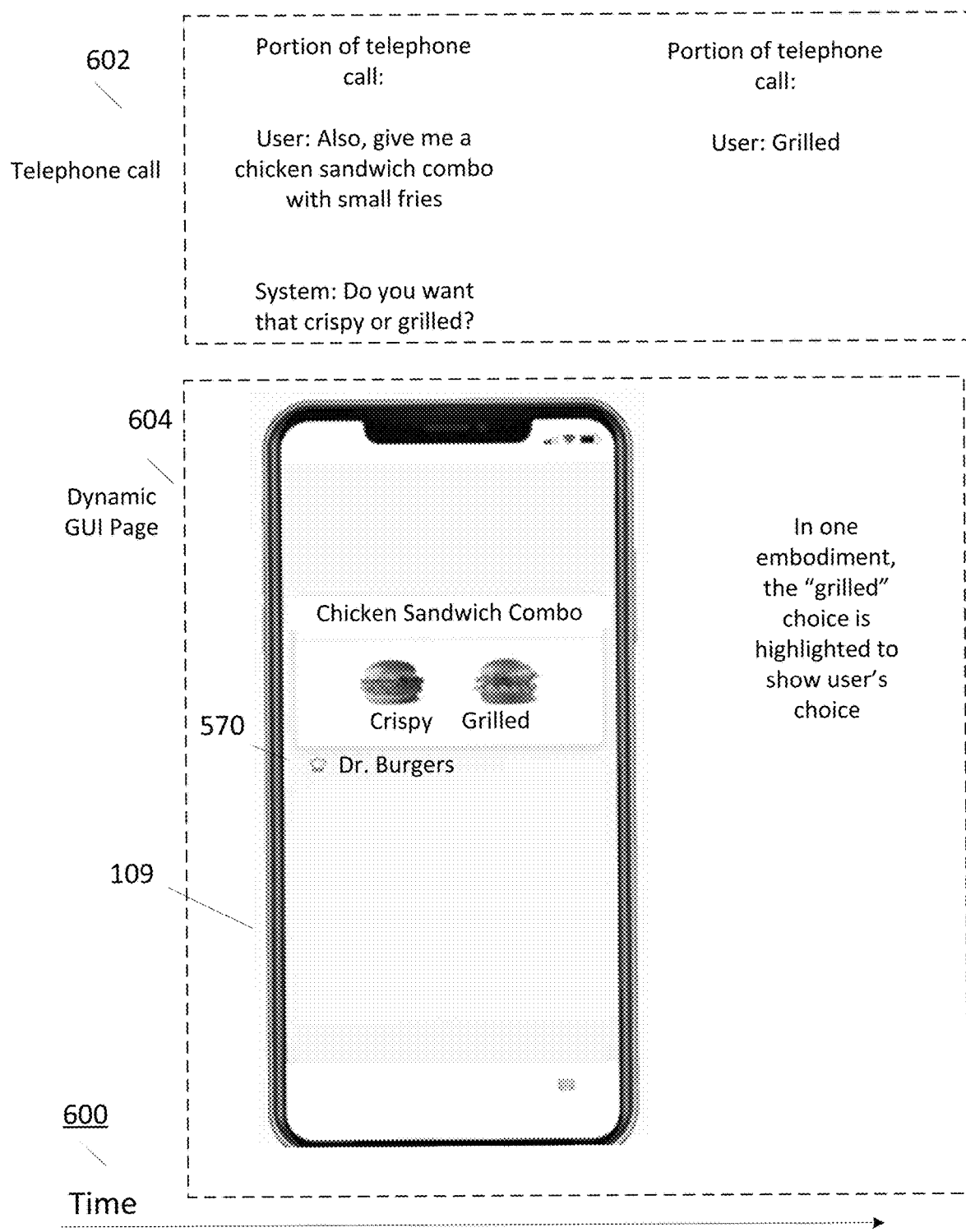
Figure 6B:
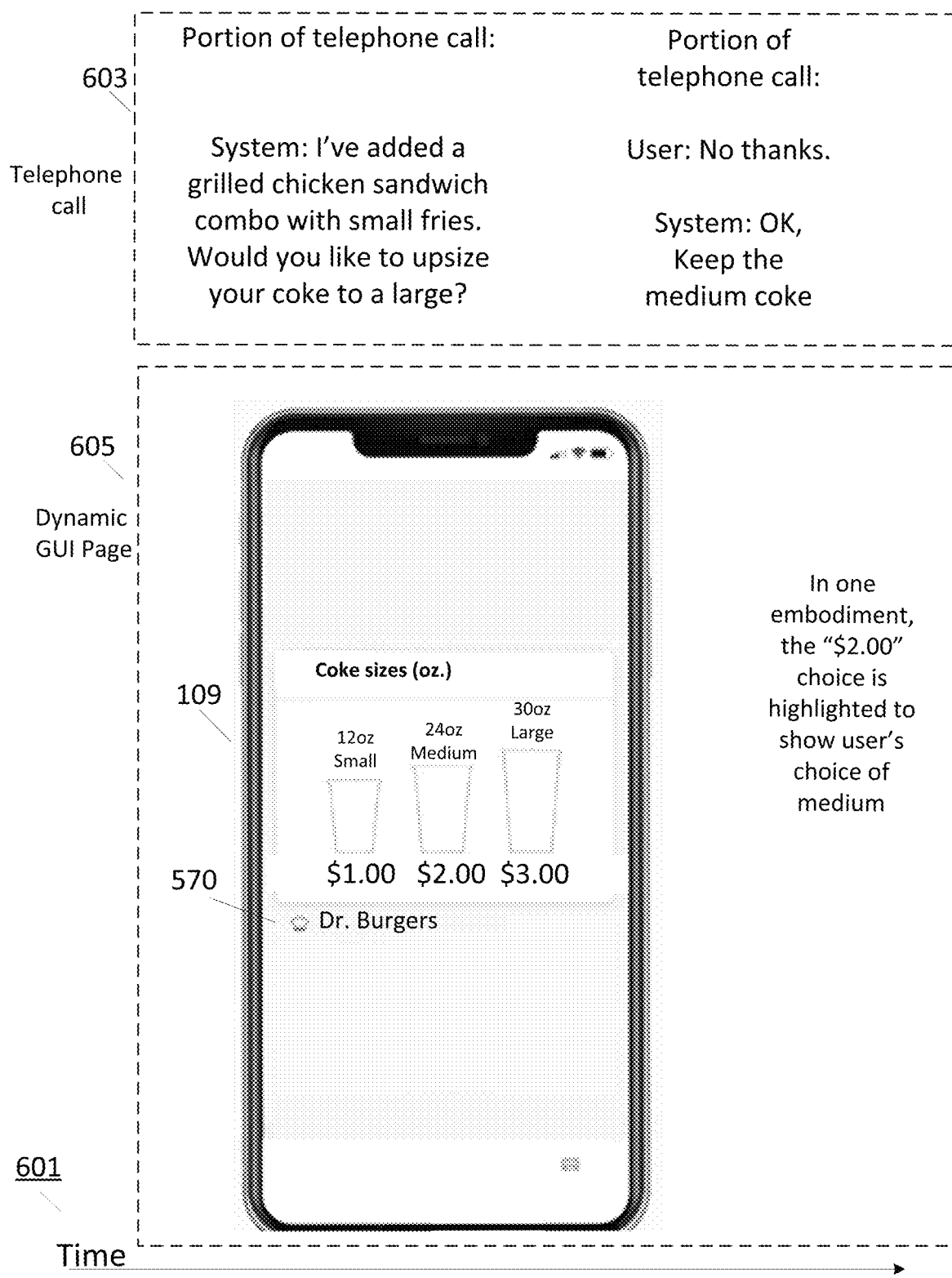

FIGS. 6(a) and 6(b) show a timeline that is a continuation of the timeline of FIGS. 5(a) and 5(b), showing a telephone call 602, 603 between voice ordering system 160 and user 150 and further showing a dynamic GUI pages 604, 605 displayed on a device of the user throughout the timeline.

In the example of FIG. 6(a), during the telephone call, the user decides to add to the order by further requesting a chicken sandwich combo with small fries. System 160 checks the menu (stored in memory 162) and ascertains that there are two possible types of chicken sandwiches: crispy and grilled. Thus, before showing user 150 the updated order, system 160 asks verbally on the telephone call "Do you want that crispy or grilled?" and sends a visual representation to the GUI on device 109 showing pictures of, respectively, crispy, and grilled chicken sandwiches. Again, presenting visual information to the user allows the user to easily determine which choice they want and gives the user a better idea of what the choices are than if the system merely verbally described them.

In FIG. 6(a), during the telephone call 602 the user says that they want "grilled." Some embodiments may highlight the user's choice at his point (i.e., highlight "grilled"), although that is omitted in this example for the sake of simplicity. Some embodiments may show the user's order again at this point and ask for confirmation as shown in FIGS. 5(a) and 5(b), although that is omitted in this example for the sake of simplicity. In the example of FIG. 6(b), system 160 verbally states "I've added a grilled chicken sandwich combo."

Figure 9E:
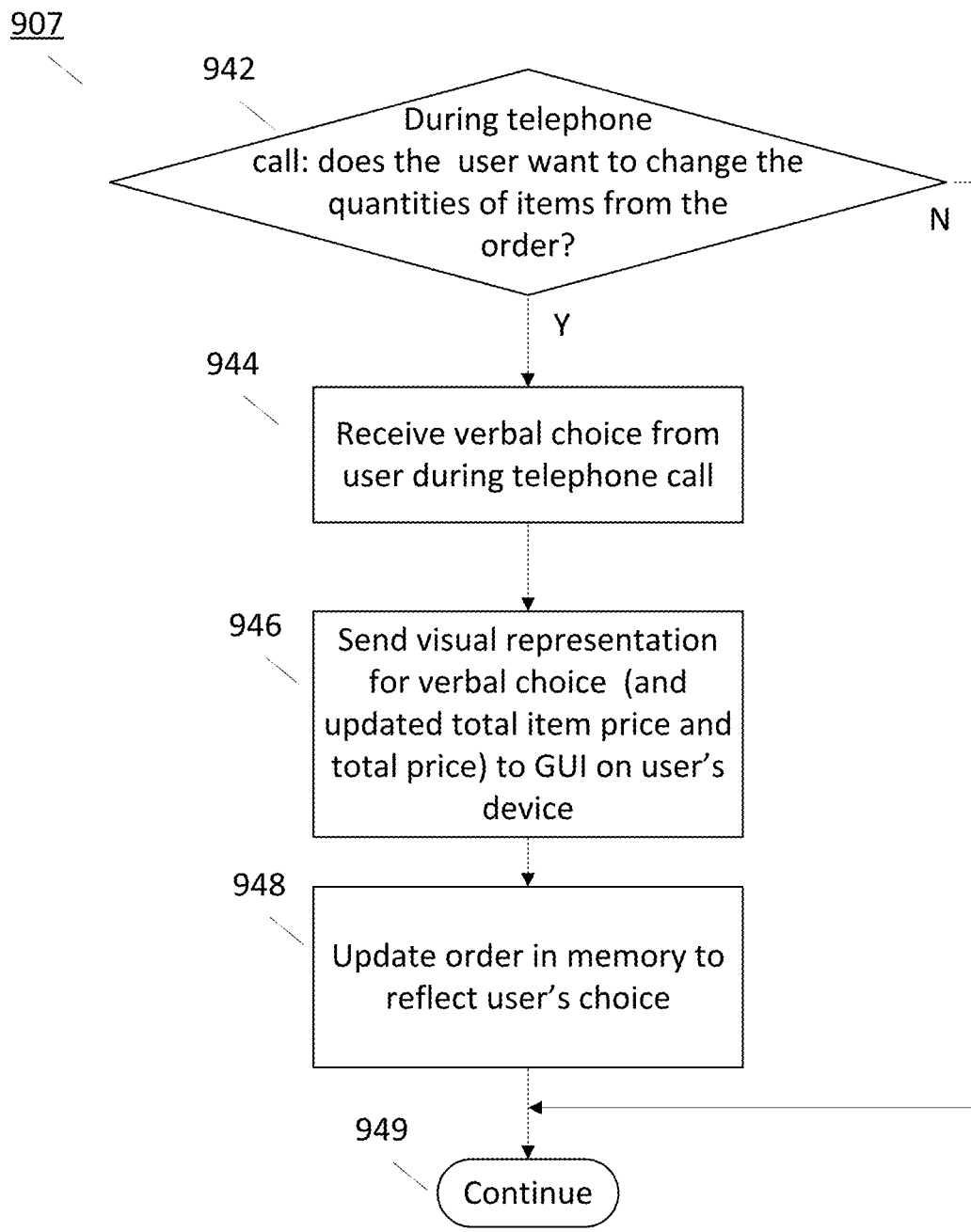
FIG. 9(e) is a flowchart of one embodiment of visually displaying a change in item quantity during the telephone call.
Figure 9F:
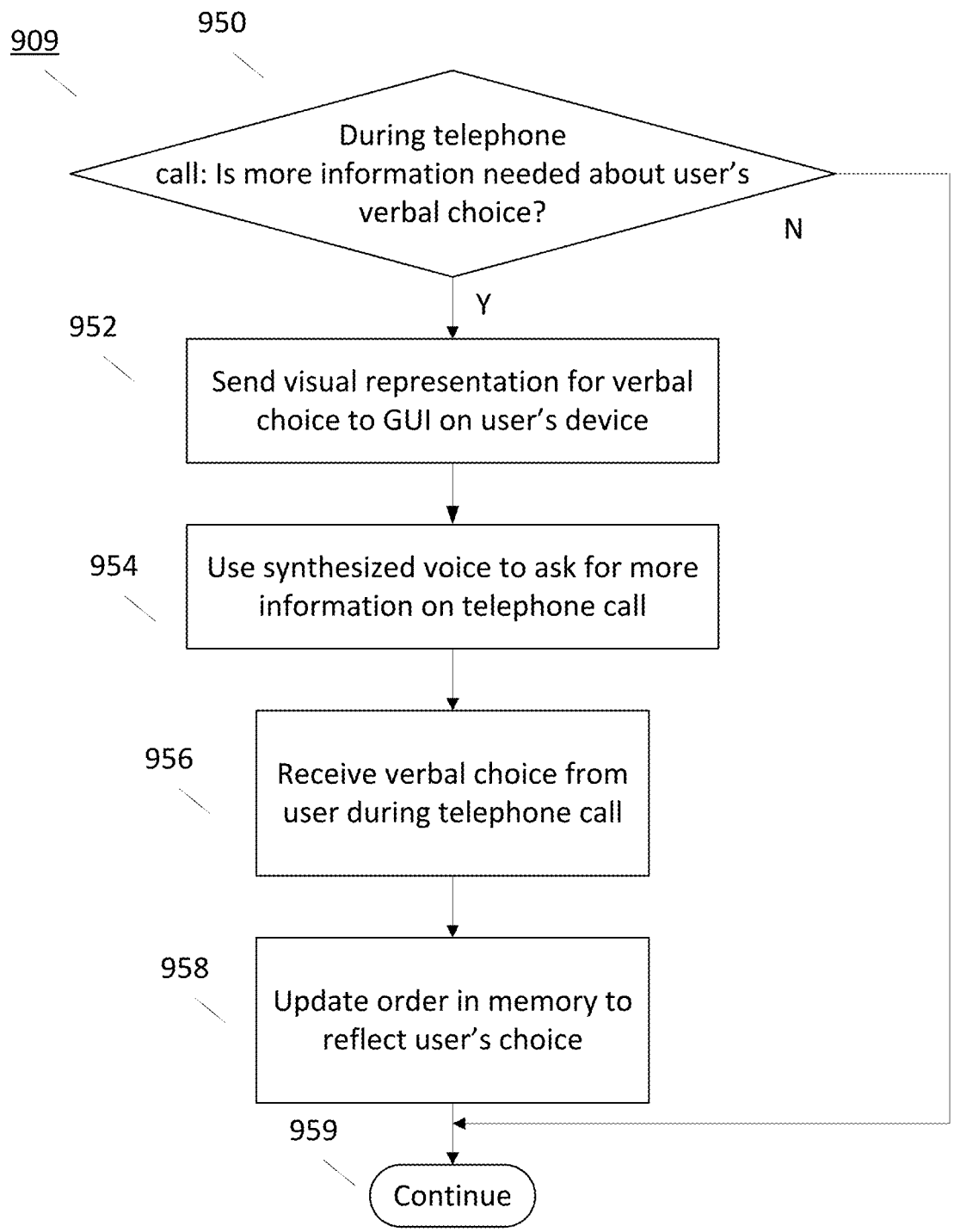
FIG. 9(f) is a flowchart of one embodiment of the interaction between voice and visual display during the telephone call.

FIG. 9(f) is a flowchart of one embodiment of asking for more information during the telephone call. During the phone call, if system 160 determines that more information is needed about the user' order, system 160 sends 952 a visual representation to the GUI and verbally requests 954 a verbal choice from the user during the telephone call. System 160 receives 956 a verbal choice from the user during the telephone call and (in the example since it is appropriate) sends a visual representation of the user's choice (and item price and updated item total price) to the GUI of device 109 for confirmation (not shown). System 160 then updates 958 the user's order stored in memory 162 to reflect the any changes resulting from the additional information provided by the user.

Upselling

In FIG. 6(b), during the telephone call 603, in one embodiment, the system determines that this user should receive an upsell. An upsell is an offer from the restaurant, here made via system 160, to purchase an additional item to an order or to change an ordered item to a more profitable one. For example, the user may have requested to receive appropriate upsells, or the user may have accepted appropriate upsells in the past. In another embodiment, the restaurant may have set parameters to instruct system 160 to upsell specific items if the user orders a specific item (such as a grilled chicken combo) or to upsell specific items in all cases ("would you like fries with that?"). In another embodiment, a restaurant may have a special promotion that they'd like to offer to all customers, which could be presented in the way an upsell is discussed herein.

In the example of FIG. 6(*b*), system 160 has an indication stored in memory 162 that it should upsell drink sizes when the user orders a grilled chicken sandwich. Thus, system 160 asks during the telephone call, "Would you like to upsize your coke to a large?" and sends a dynamic GUI page showing multiple sizes of drinks and the associated cost of each. In the example, after looking at the GUI, the user decides not to upsize and states during the telephone call "No thanks." The system confirms verbally because the confirmation is short ("OK, keep the medium coke"). In some embodiments, system 160 could also have sent a visual confirmation at this point, although that is not shown here for purposes of simplicity. Some embodiments may show the user's order again at this point and ask for confirmation as shown in FIGS. 5(*a*) and 5(*b*), although that is omitted in this example for the sake of simplicity.

FIG. 9(*g*) is a flowchart of one embodiment of performing upselling during the telephone call. During the phone call, if system 160 determines that the system should make an attempt to upsell (911), system 160 sends a visual representation of the upsell options to the GUI on device 109 (962) and uses a synthesized voice offer an upsell to a user (964). A verbal upsell choice is received 966 from the user on the telephone call. If the user says on the telephone call that they accept the upsell (968), system 160 sends 970 a visual representation of the verbal choice (and item price and updated total price) to GUI on device 109. System 160 then updates the user's order stored in memory 162 to reflect the user's choice (972) and then continues 973.

Adding/Deleting/Substituting/Changing Size and Quantity

Figure 7A:
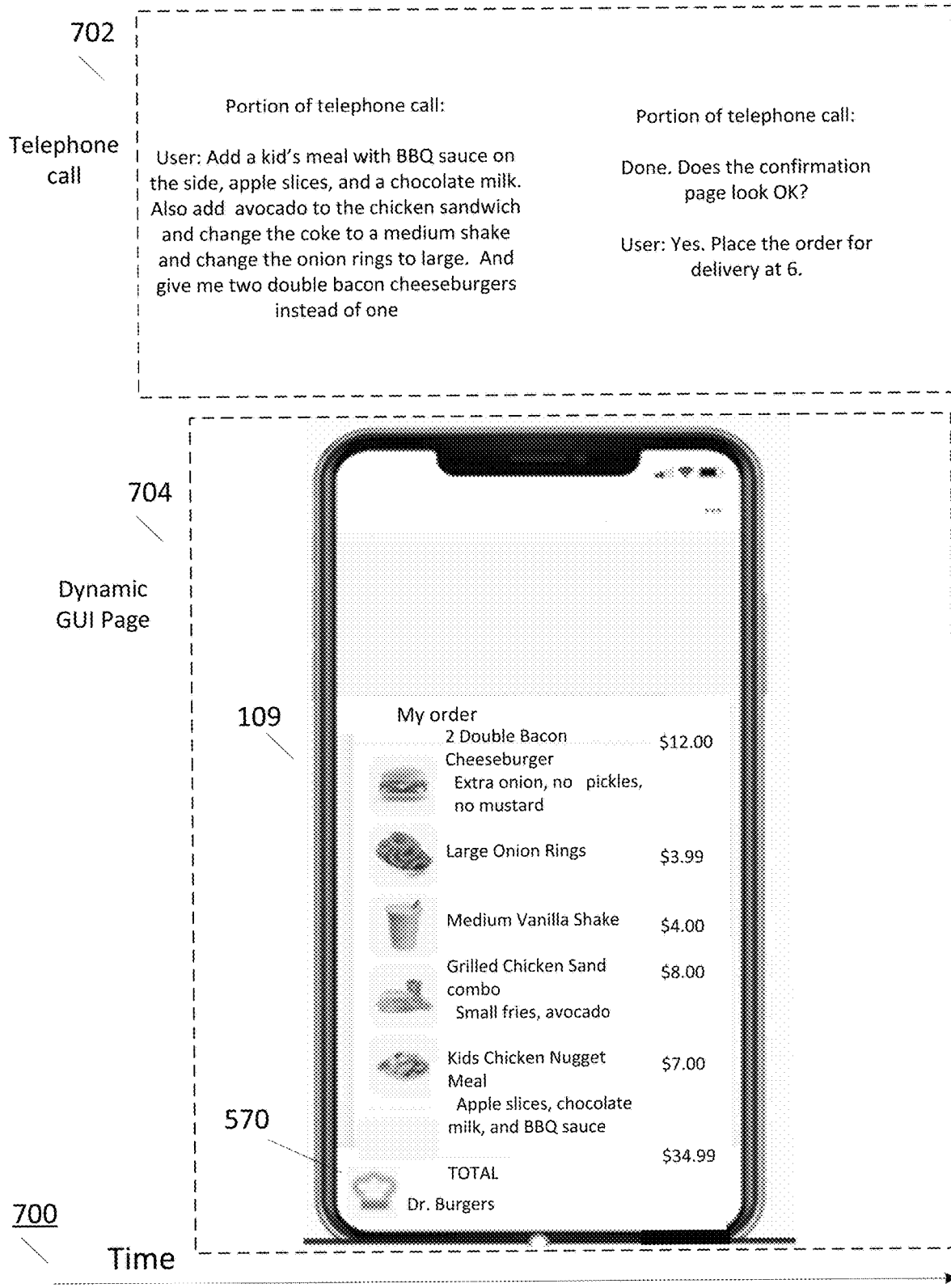
Figure 7B:
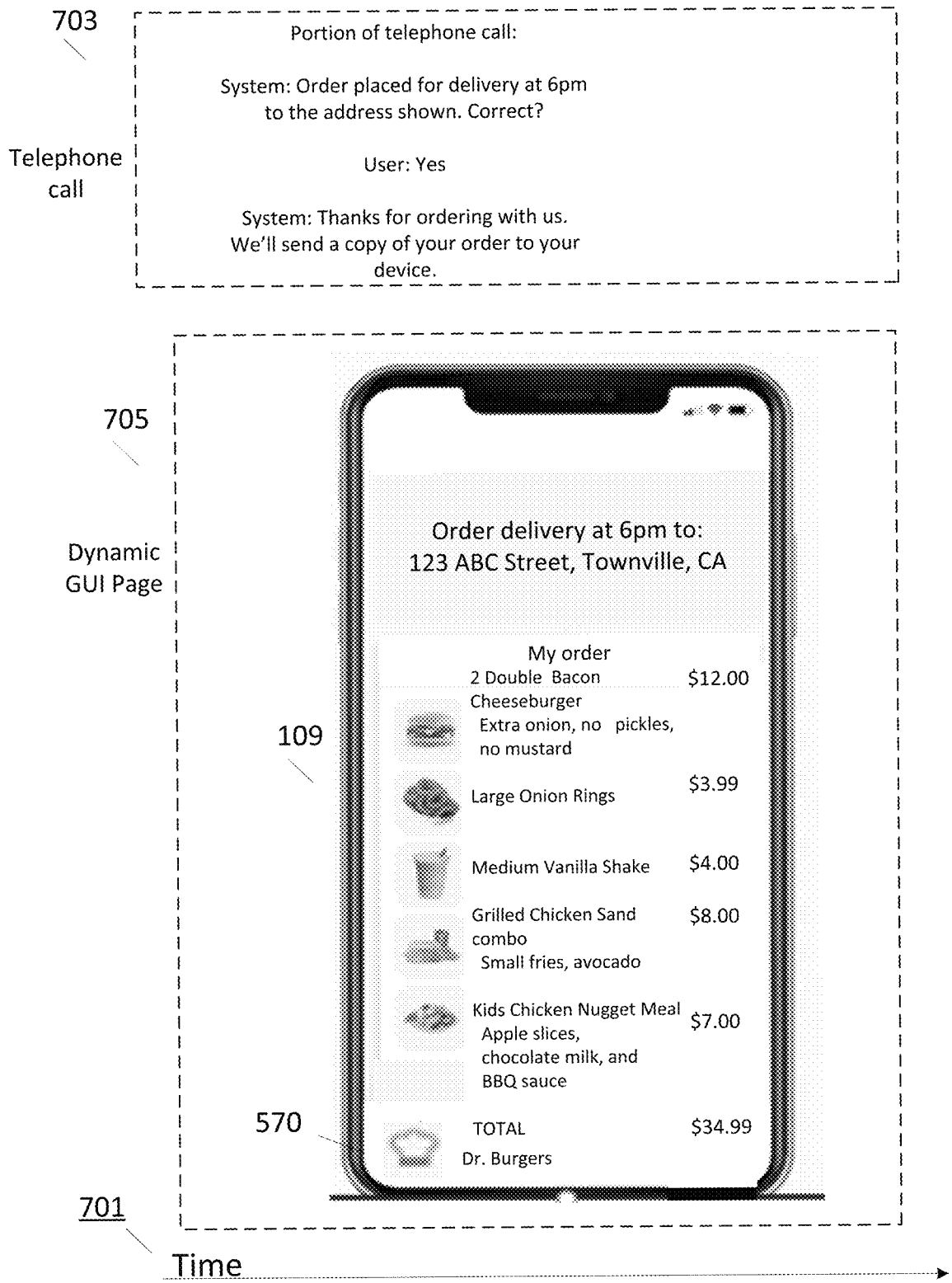

FIGS. 7(*a*) and 7(*b*) show a timeline that is a continuation of the timeline of FIGS. 6(*a*) and 6(*b*) showing a telephone call 702, 703 between voice ordering system 160 and user 150 and further showing multiple dynamic GUI pages 704, 705 displayed on device 109 of the user throughout the timeline.

In FIG. 7(*a*), the user, during the telephone call 602, adds a kid's meal with BBQ sauce on the side, apple slices, and a chocolate milk. The user, during the telephone call, changes the sandwich order by adding an avocado to the sandwich. The user, during the telephone call, changes the coke to a medium shake, and changes the order of onion rings to large. The user, during the telephone call, also changes one double bacon cheeseburger to two. As the user is speaking each item, system 160 sends an update to the dynamic GUI to reflect the change to the order. Other embodiments may wait to update the GUI until the user has paused speaking. After the user finishes changing the one double bacon cheeseburger to two, the GUI visually reflects the order as shown in FIG. 7(*a*). In FIG. 7(*a*), the order shown in the GUI visually shows:

Double bacon cheeseburger, one to two, price changes from $6.00 to $12.00. Updating the individual prices and total price visually on the GUI as an order changes "on the fly" is very helpful to the user as they can tell how much it will cost, before the order is finalized.

Changed from onion rings to large onion rings and updated the price from $2.99 to $3.99. Again, updating the price visually as an order changes "on the fly" is very helpful to the user.

Deleted the coke and added a medium vanilla shake (or changed to coke to a milkshake) and updated the price to $4.00, shown visually on the GUI.

Changed the grilled chicken sandwich order to include an avocado (no price change).

Added the kid's meal with the included sides of apple slices, chocolate milk, and BBQ sauce, showing the price of $7.00 on the GUI.

Updated total price to $34.99.

The dynamic GUI page is displayed on the user device 109 throughout this example.

In FIGS. 7(*a*) and 7(*b*), as discussed, visually displaying the prices for each item on the GUI as the item is changed and visually displaying the total price as the order changes "on the fly" makes it easier for the user to understand the order and saves the user having to listen to multiple changing prices read verbally.

In FIG. 7(*a*), system 160, during the telephone call 702, asks if the confirmation page looks OK and the user responds, during the telephone call, "Yes, Place the order for delivery at 6."

In FIG. 7(*b*), system 160 responds, during the telephone call, "Order placed for delivery at 6 pm to the address shown. Correct?" and sends the user's address to the GUI 705 for display. In this example, system 160 already stores the user's address in memory 162. In another embodiment, if the user's address is not yet in the system, they would be requested to verbally provide the address, and then the recognized address would be shown on the GUI. In one embodiment, the address may be shown with a map. The user responds "Yes" to verify their address during the telephone call and system 160 responds verbally "Thanks for ordering with us. We'll send a copy of your order to your device". In this example, the telephone call is disconnected. An email, text, or other message confirming the order is normally sent to the user. In other examples, the system may ask for the user's address during the telephone call and display it on the GUI for confirmation as described above. In other examples, the system may ask for the desired delivery time during the telephone call and display it on the GUI for confirmation by the user as described above.

FIG. 9(*c*) is a flowchart of one embodiment of deleting an item during the telephone call. During the telephone call, if the user wants to make a deletion (924), system 160 receives 926 a verbal choice from the user during the telephone call. System 160 sends 928 a visual representation for the verbal choice to the GUI on the user's device 109. System 160 updates the order in memory 162 to reflect the user's deletion choice in 930, and processing continues in 931. As discussed above, the entire change or addition would not normally be read out during the phone call as it would take too long a time to do so.

FIG. 9(*d*) is a flowchart of one embodiment of changing the size of an item during the telephone call (932, 934). During the telephone call, if the user wants to change an item size, system 160 receives 936 a verbal choice from the user during the telephone call. System 160 sends 938 a visual representation for the verbal choice to the GUI on the user's device 109. System 160 updates the order in memory 162 to reflect the user's deletion choice in 940, and processing continues in 941. As discussed above, the entire change or addition would not normally be read out during the phone call as it would take too long a time to do so.

FIG. 9(e) is a flowchart of one embodiment of changing quantities of an item during the telephone call. During the telephone call, if the user wants to change an item quantity (942), system 160 receives 944 a verbal choice from the user during the telephone call. System 160 sends 946 a visual representation for the verbal choice to the GUI on the user's device 109. System 160 updates the order in memory 162 to reflect the user's change in quantity choice in 948, and processing continues in 949. As discussed above, the entire change in quantity would not normally be read out during the phone call if it would take too long a time to do so.

Providing Additional Information that the User Requests by Sending it to the GUI It is also possible for system 160 to provide via the GUI additional information requested by the user. In one embodiment, the system recognizes the user's verbal request and responds verbally, via the GUI, or with a combination of verbal and GUI data. Some examples of the types of questions that may be associated with a restaurant order this include the following, although these examples should not be taken to limit possible information requested by the user. In each situation below, system 160 receives the user's verbal request during the telephone call and provides a visual response via the dynamic GUI and possibly a verbal response via the telephone. Some examples of such requests comprise:

Is the spaghetti good?
What's the soup today?
Could you show me my current order?
When do you close?
When do you open?
Do you have outdoor seating?

Receiving Additional Information from the User Through the GUI

In certain situations, the user may want to enter information using the GUI instead of responding verbally. For example, the user may have the option to approve the order verbally or by clicking an "approved" or "complete order" button on the GUI. In one embodiment, the user may request a checkbox menu during the phone call, which is sent by system 160 and displayed on the GUI. The user then clicks on their device 109 to check boxes on the checkbox menu to indicate their order, and the GUI's dynamic web page sends information concerning which boxes the user checked to system 160. In one embodiment, the user may request GUI-based interactions, or the system may automatically provide GUI-based interactions to the user.

F. Hardware Example

Figure 10:
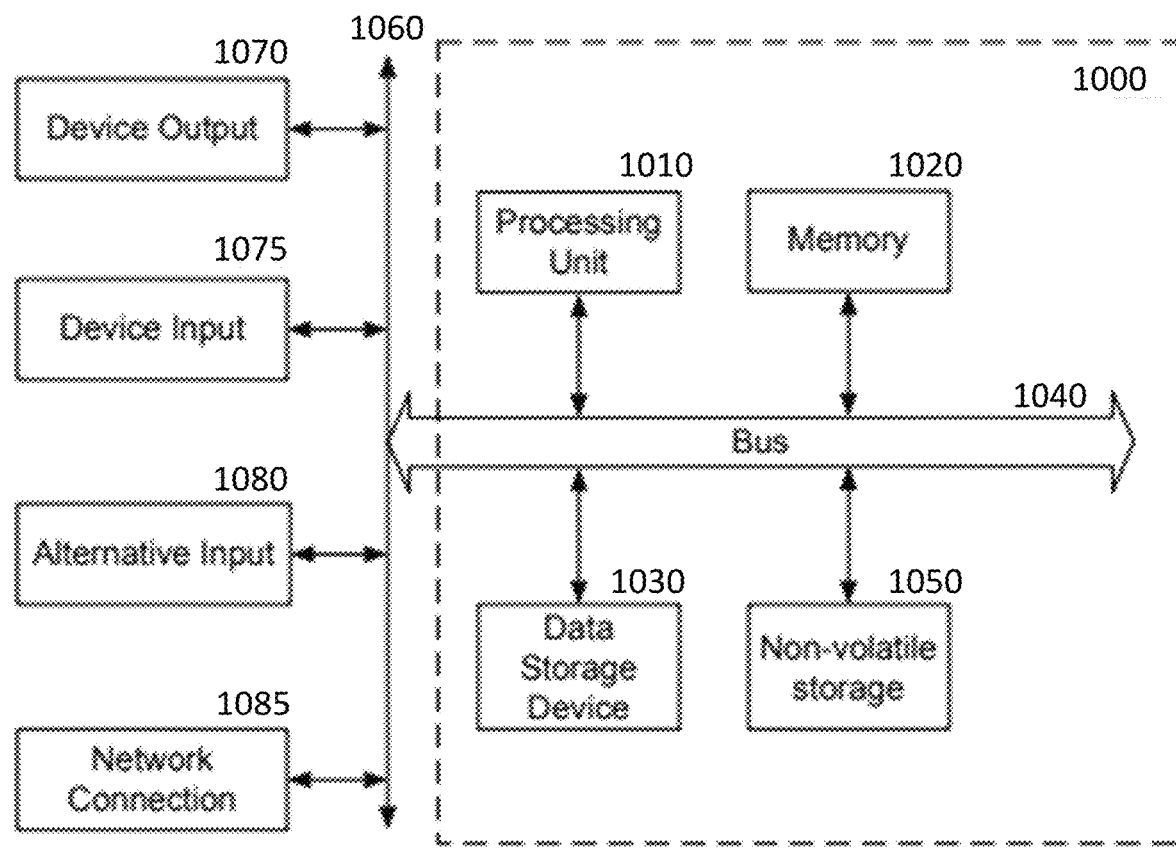
FIG. 10 is a block diagram of one embodiment of a computer system that may be used in the described embodiments.

FIG. 10 is a block diagram of one embodiment of a computer system 1000 that may be used with the present invention. It will be apparent to those of ordinary skill in the art, however that other alternative systems of various system architectures may also be used. A computer system such as shown in FIG. 10 may be used to implement, for example, voice ordering system 160 of FIG. 1(a) and/or the individual elements 104, 106, and 108 of FIG. 2, which are implemented as software executing on a processor in one embodiment. Computer system 1000 could also be used to implement the user's device 109 if it also includes telephone capability for the embodiment described in connection with, for example, FIG. 2. The functionality of these devices and elements are embodied, for example, in computer code stored in a memory or storage system of the system as described below.

The data processing system illustrated in FIG. 1(a)0 includes a bus or other internal communication means 1040 for communicating information, and a processing unit 1010 coupled to the bus 1040 for processing information. The processing unit 1010 may be a central processing unit (CPU), a digital signal processor (DSP), or another type of processing unit 1010.

The system further includes, in one embodiment, a random access memory (RAM) or other volatile storage device 1020 (referred to as memory), coupled to bus 1040 for storing information and instructions to be executed by processor 1010. Memory 1020 may also be used for storing temporary variables or other intermediate information during execution of instructions by processing unit 1010.

The system also comprises in one embodiment a non-volatile storage 1050 such as a read only memory (ROM) coupled to bus 1040 for storing static information and instructions for processor 1010. In one embodiment, the system also includes a non-volatile data storage device 1030, such as a magnetic disk or optical disk and its corresponding disk drive, or flash memory or other storage which is capable of storing data when no power is supplied to the system. Data storage device 1030 in one embodiment is coupled to bus 1040 for storing information and instructions.

The system may further be coupled to an output device 1070, such as an LED display or a liquid crystal display (LCD) coupled to bus 1040 through bus 1060 for outputting information. The output device 1070 may be a visual output device, an audio output device, a Smarthome controller, and/or haptic output device (e.g., vibrations, etc.). For the user's device 109 and voice ordering system 160, the input and output further includes phone capability in addition to a way to connect to a network such as the internet.

An input device 1075 may be coupled to the bus 1060. The input device 1075 may be a text input device, such as a keyboard including alphanumeric and other keys, for enabling a user to communicate information and command selections to processing unit 1010. An additional user input device may further be included. One such user input device 1080 is cursor control device 1080, such as a voice control, a mouse, a trackball, stylus, cursor direction keys, or touch screen, which may be coupled to bus 1040 through bus 1060 for communicating direction information and command selections to processing unit 1010. In the described embodiments of the invention devices have microphones that receive spoken utterances of the user.

Another device, which may optionally be coupled to computer system 1000, is a network connection device 1085 for accessing other nodes of a distributed system via a network. The communication device 1085 may include any of a number of commercially available networking peripheral devices such as those used for coupling to an Ethernet, token ring, Internet, or wide area network, personal area network, wireless network or other method of accessing other devices. The communication device 1085 may further be any other mechanism that provides connectivity between the computer system 1000 and the outside world.

Note that any or all of the components of this system illustrated in FIG. 1(a)0 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in memory 162, mass storage device 1030, or other storage medium locally or remotely accessible to processor 1010.

It will be apparent to those of ordinary skill in the art that the system, method, and process described herein can be implemented as software stored in main memory 1020 or non-volatile storage 1050 and executed by processor 1010. This control logic or software may also be resident on an article of manufacture comprising a computer readable medium having computer readable program code embodied therein and being readable by the mass storage device 1030 and for causing the processor 1010 to operate in accordance with the methods and teachings herein.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g., a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical, or other forms of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method for an interactive voice and GUI system, comprising:
   receiving, at a voice ordering server, a voice telephone call from a mobile device associated with a telephone number;
   transmitting the voice telephone call to a middleware reflecting voice from the telephone call;
   performing speech recognition on audio information of the voice telephone call;
   determining response data in an optimal format based on the audio information of the voice telephone call, wherein the response data comprises interactive audio data and visual data, and wherein the audio data is delivered via synthesized speech on the voice telephone call and the visual data is displayed on the mobile device via a URL;
   sending, after confirming via the audio data by the voice ordering server, a text message to the mobile device associated with the telephone number, the text message containing the URL to deliver the visual data displayed on the mobile device;
   receiving a request from the mobile device to the URL;
   serving code that when rendered by the mobile device, provides a graphical display of a first choice associated with the URL, wherein the first choice is recognized through speech recognition by the voice ordering server;
   performing speech recognition on audio received via the mobile device to interpret the interaction of the voice telephone call;
   updating the graphical display based on the interaction of the voice telephone call;
   serving code that, when rendered by the mobile device, provides an updated graphical display acknowledging the updated first choice; and
   terminating the URL upon completion of the voice telephone call.

2. The method of claim 1, further comprising, during the telephone call:
   recognizing a second choice from the interaction of the voice telephone call; and
   serving code that changes the graphical display in response to the second choice.

3. The method of claim 2, wherein the second choice changes a quantity of the first choice.

4. The method of claim 2, wherein the second choice adds an item to the first choice.

5. The method of claim 2, wherein the second choice removes an item from the first choice.

6. The method of claim 2, wherein the second choice changes an item size of the first choice.

7. The method of claim 2, further comprising:
   offering, via synthesized speech during the telephone call, an upsell item; and
   sending, during the telephone call, visual information about the upsell item to the graphical user interface;
   wherein the user's second choice is the offered upsell item and the graphical display is updated to show the second choice.

8. The method of claim 7 wherein the synthesized voice is sent through the internet for output.

9. The method of claim 7 wherein the synthesized voice is sent via the mobile device.

10. The method of claim 2, further comprising:
    requesting additional information, via synthesized speech during the telephone call, about the user's first choice; and
    sending, during the telephone call, visual information about the requested additional information to the graphical display;
    wherein the user's second choice is a user's response to the request for additional information and the graphical user interface is updated to show the second choice.

11. The method of claim 1, further comprising:
    sending the user's first choice to a third-party ordering system.

12. The method of claim 1, further comprising:
    sending the user's second choice to a third-party ordering system.

13. The method of claim 1 further comprising serving images in conjunction with the code that provides a graphical display.

14. An interactive voice and GUI ordering system, comprising:
    a memory storing software that executed by a processor, causes the system to:
    receive, at a voice ordering server, a phone call from a mobile device associated with a telephone number;
    transmitting the voice telephone call to a middleware reflecting voice from the telephone call;
    perform speech recognition on audio information of the phone;
    determining response data in an optimal format based on the audio information of the voice telephone call, wherein the response data comprises interactive audio data and visual data, wherein the audio data is delivered via synthesized speech on the voice telephone call and the visual data is displayed on the mobile device via a URL;

send, after confirming via the audio data by the voice ordering server, a text message to the mobile device associated with the telephone number, the text message containing the URL to deliver the visual data displayed on the mobile device;

receive a request from the mobile device to the URL;

send a dynamic GUI web page reflecting current order information of a voice order from the phone call, wherein the dynamic GUI web page is associated with the URL, and the current order information of the voice order is recognized through speech recognition by the voice ordering server;

receive updated audio information, from the mobile device for the voice order;

perform speech recognition on the received updated audio information to yield recognized speech and to interpret the interaction of the phone call;

update, in accordance with the recognized speech, the dynamic GUI web page reflecting the updated order information; and terminate the URL upon completion of the voice telephone call.

15. The system of claim 14, further comprising:
an interface that provides the order information reflecting a state of the voice order to a third party ordering system, wherein the state of the voice order includes items corresponding to the phone call.

16. The voice ordering system of claim 14, further comprising a memory storing upselling criteria, wherein the software further causes the system to:
determine an upsell by applying the upsell criteria to the state of the voice order; and
send an update to the dynamic GUI web page, the update comprising the upsell.

* * * * *